United States Patent [19]
Sato et al.

[11] Patent Number: 5,505,057
[45] Date of Patent: Apr. 9, 1996

[54] PATTERN CLASSIFICATION SYSTEM

[75] Inventors: Masaaki Sato; Motohiko Naka, both of Kawasaki; Takehiko Shida, Yokohama; Kunio Yoshida; Mie Saitoh, both of Kawasaki; Ikuo Akamine, Kusatsu; Makoto Shimizu, Kyoto; Katsuhiko Fujiwara, Kusatsu; Akira Yokouchi, Shiga, all of Japan

[73] Assignee: Matsushita Electric Industrial Co., Ltd., Osaka, Japan

[21] Appl. No.: 260,425

[22] Filed: Jun. 16, 1994

Related U.S. Application Data

[60] Division of Ser. No. 935,099, Aug. 27, 1992, Pat. No. 5,337,371, which is a continuation-in-part of Ser. No. 925,674, Aug. 7, 1992, abandoned.

[30] Foreign Application Priority Data

| Aug. 9, 1991 | [JP] | Japan | 3-200864 |
| Aug. 28, 1991 | [JP] | Japan | 3-216847 |
| Aug. 5, 1992 | [JP] | Japan | 4-208708 |

[51] Int. Cl.$^6$ ............................................. G06F 17/00
[52] U.S. Cl. .................... 62/231; 165/12; 236/78 D; 395/61
[58] Field of Search ................. 165/12, 26; 236/78 D, 236/49.3, 46 R; 395/61, 21; 62/231

[56] References Cited

U.S. PATENT DOCUMENTS

| 3,950,733 | 4/1976 | Cooper et al. | 340/172.5 |
| 4,760,604 | 7/1988 | Cooper et al. | 382/15 |
| 5,145,112 | 9/1992 | Ueda | 62/186 X |
| 5,285,959 | 2/1994 | Nanba et al. | 236/78 D |
| 5,372,015 | 12/1994 | Suzuki et al. | 236/78 D |

FOREIGN PATENT DOCUMENTS

| 0191407 | 8/1986 | European Pat. Off. |
| 61-193279 | 8/1986 | Japan |
| 63-108145 | 5/1988 | Japan |

OTHER PUBLICATIONS

"Neural Network Model For Realtime Adaptation To Rapidly Changing Environment" by Yoshinori Okamoto; The Japanese Institute of Electronics, Information and Communication Engineers, Transactions D–II, vol. J73–D–II, No. 8; Aug., 1990; pp., 1186–1191.

"Self–Organization and Associative Memory", 2nd, Springer–Verlag, 1988, by T. Kohonen; pp., 199–202.

*Primary Examiner*—William E. Wayner
*Attorney, Agent, or Firm*—Lowe, Price, LeBlanc & Becker

[57] ABSTRACT

A pattern classification system includes a plurality of classification sections. Each of the classification sections includes a device for storing information of N coefficients W representing a reference pattern, a device for calculating an evaluation value V on the basis of N input signals S and the N coefficients W, the N input signals representing an input pattern, the evaluation value V representing a relation between the input pattern and the reference pattern, a device for storing information of a fixed threshold value R, and a device for comparing the evaluation value V and the threshold value R and for outputting an estimation signal depending on a result of the comparing, the estimation signal including a category signal P which represents a category. A selection section is operative for selecting one of categories in response to the category signals outputted from the classification sections and for outputting a signal Px representing the selected one of the categories. An adjustment section is operative for adjusting parameters in the classification sections in response to the output signal Px of the selection section and a teacher signal T, the parameters including the coefficients W.

14 Claims, 21 Drawing Sheets

PATTERN CLASSIFICATION SYSTEM

CROSS-REFERENCES TO RELATED APPLICATIONS

This application is a division of application Ser. No. 07/935,099 filed Aug. 27, 1992, now U.S. Pat. No. 5,337,371 which is a continuation-in-part of U.S. patent application Ser. No. 07/925,674 filed on Aug. 7, 1992 and entitled "pattern classification device", and now abandoned.

BACKGROUND OF THE INVENTION

This invention relates to a pattern classification system. This invention also relates to an environment recognition system and an air conditioner system using the principle of pattern classification.

Pattern classification has been widely performed in the technical field of information processing such as speech recognition processing and image recognition processing. Various algorithms have been developed for pattern classification. Some prior art pattern classification uses a learning vector quantization model (or a learning vector quantum model, an LVQ model). Also, there is prior art pattern classification using Cooper's model (see Japanese published unexamined patent application 61-193279 corresponding to U.S. Pat. No. 4,760,604). Furthermore, it is known to use a PDM model in pattern classification (see The Japanese Institute of Electronics, Information and Communication Engineers, Transactions D-II, Vol. J73-D-II, pp. 1186–1191, August 1990). As will be explained later, prior art pattern classification has some problems.

Some of prior art air conditioner systems have a section for detecting environment conditions, and a section for controlling output air in response to the detected environment conditions (see Japanese published unexamined patent application 63-108145). As will be explained later, a prior art air conditioner system has some problems.

Co-pending U.S. patent application, Ser. No. 735,727, filed on Jul. 25, 1991, relates to control of an air conditioner which uses a neural network model.

SUMMARY OF THE INVENTION

It is a first object of this invention to provide an improved pattern classification system.

It is a second object of this invention to provide an improved environment recognition system.

It is a third object of this invention to provide an improved air conditioner system.

A first aspect of this invention provides a pattern classification system comprising a plurality of classification sections each including means for storing information of N coefficients W representing a reference pattern, means for calculating an evaluation value V on the basis of N input signals S and the N coefficients W, the N input signals representing an input pattern, the evaluation value V representing a relation between the input pattern and the reference pattern, means for storing information of a fixed threshold value R, and means for comparing the evaluation value V and the threshold value R and for outputting an estimation signal depending on a result of the comparing, the estimation signal including a category signal P which represents a category; a selection section for selecting one of categories in response to the category signals outputted from the classification sections and for outputting a signal Px representing the selected one of the categories; and an adjustment section for adjusting parameters in the classification sections in response to the output signal Px of the selection section and a teacher signal T, the parameters including the coefficients W.

A second aspect of this invention provides an environment recognition system comprising a plurality of sensors for detecting environment conditions; memory means for storing previously-occurring output signals of the sensors; setting means for setting parameters in response to user's operation; an operation time detector for detecting an operation time; inference means for inferring information related to an estimation index of at least one of user's will and the system on the basis of output signals of the sensors, the memory means, the setting means, and the operation time detector; an operation device for inputting information related to an estimation index of at least one of user's will and the system in response to user's operation; and learning means for learning a relation of the information related to the estimation index of at least one of the user's will and the system while using an output signal of the operation device as a teacher signal.

A third aspect of this invention provides an environment recognition system comprising a plurality of sensors for detecting environment conditions; memory means for storing previously-occurring output signals of the sensors; setting means for setting parameters in response to user's operation; an operation time detector for detecting an operation time; a calculator for calculating a feature signal representing a feature of at least one of output signals of the sensors, the memory means, the setting means, and the operation time detector; inference means for inferring information related to an estimation index of at least one of user's will and the system on the basis of output signals of the sensors, the memory means, the setting means, the operation time detector, and the calculator; an operation device for inputting information related to an estimation index of at least one of user's will and the system in response to user's operation; and learning means for learning a relation of the information related to the estimation index of at least one of the user's will and the system while using an output signal of the operation device as a teacher signal.

A fourth aspect of this invention provides an environment recognition system comprising a plurality of sensors for detecting environment conditions; memory means for storing previously-occurring output signals of the sensors; setting means for setting parameters in response to user's operation; an operation time detector for detecting an operation time; inference means for inferring information related to an estimation index of at least one of user's will and the system on the basis of output signals of the sensors, the memory means, the setting means, and the operation time detector; an operation device for inputting information related to an estimation index of at least one of user's will and the system in response to user's operation; and learning means for learning a relation of the information related to the estimation index of at least one of the user's will and the system while using an output signal of the operation device as a teacher signal; wherein the inference means and the learning means comprises a pattern classification system including a plurality of classification sections each including means for storing information of N coefficients W representing a reference pattern, means for calculating an evaluation value V on the basis of N input signals S and the N coefficients W, the N input signals representing an input pattern, the evaluation value V representing a relation between the input pattern and the reference pattern, means for storing information of a fixed threshold value R, means for comparing the evaluation value V and the threshold value R and for outputting an estimation signal depending on a result of the comparing, the estimation signal including a category signal P which represents a category; a selection section for selecting one of categories in response to the category signals outputted from the classification sections and for outputting a signal Px representing the selected one of the categories; and an adjustment section for adjusting parameters in the classification sections in response to the output signal Px of the selection section and a teacher signal T, the parameters including the coefficients W.

A fifth aspect of this invention provides an air conditioner system comprising an air conditioner; and an environment recognition system for controlling the air conditioner; wherein the environment recognition system comprises a plurality of sensors for detecting environment conditions; memory means for storing previously-occurring output signals of the sensors; setting means for setting parameters in response to user's operation; an operation time detector for detecting an operation time; inference means for inferring information related to an estimation index of at least one of user's will and the system on the basis of output signals of the sensors, the memory means, the setting means, and the operation time detector; an operation device for inputting information related to an estimation index of at least one of user's will and the system in response to user's operation; and learning means for learning a relation of the information related to the estimation index of at least one of the user's will and the system while using an output signal of the operation device as a teacher signal.

DESCRIPTION OF THE PRIOR ART

Cooper's model for pattern classification is referred to as a Restricted Coulomb Energy (RCE) model. In general, the RCE model features a good learning efficiency. A basic characteristic of the RCE model resides in that a non-linear region (namely, a multidimensional hyper-sphere) is covered by one processing unit, that is, a neuron. Hereafter, such a processing unit is sometimes referred to simply as a unit.

The RCE model is of the hierarchical structure having an input layer, an intermediate layer (namely, an interior layer), and an output layer. The learning rule or principle of the RCE model has the following steps:

(1) The generation of a neuron; and (2) The modification of a "threshold level" of a neuron (namely, in the case of classifying patterns represented by two-dimensional coordinates, a "radius" of a neuron).

Figure 1:
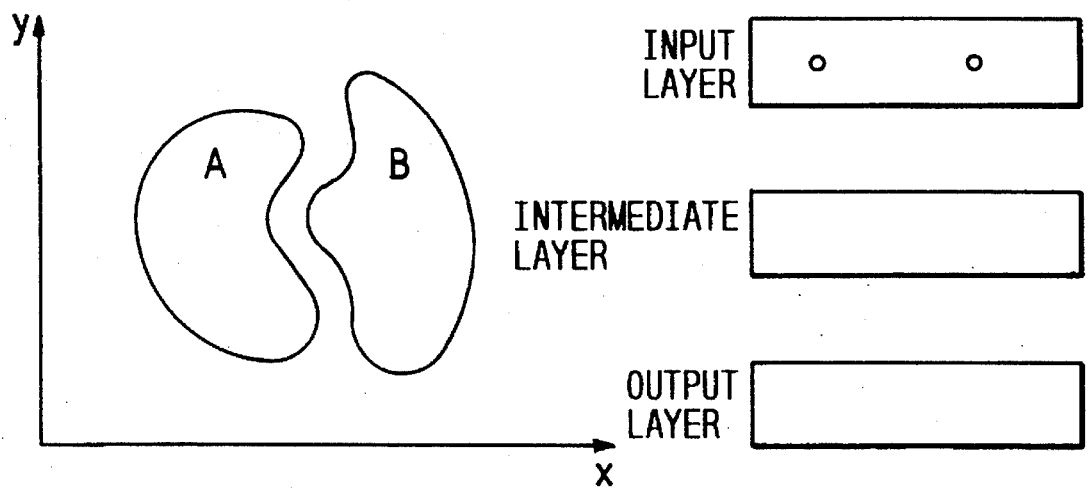
FIGS. 1–5 are diagrams showing an operation of a prior art pattern classification system.

A prior art pattern classification system using an RCE model will be described hereinafter. Under conditions where patterns represented by two-dimensional coordinates (x, y) are required to be classified into two classes (A, B) as shown in FIG. 1, the prior art pattern classification system operates as follows. Under these conditions, at an initial state of the system which occurs before the execution of learning, no neuron is generated in intermediate and output layers.

Figure 2:
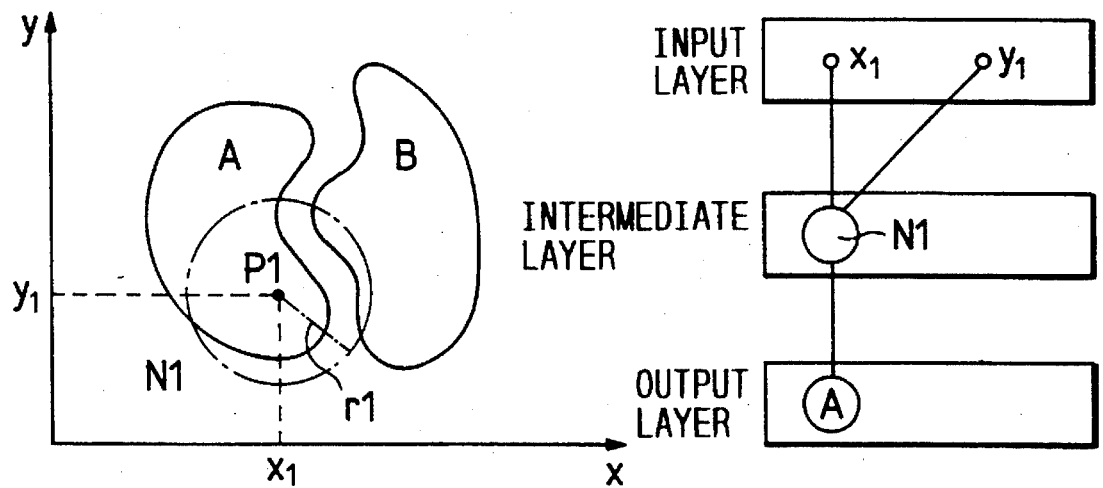

During a subsequent period, when an input pattern P1 is inputted into an input layer as shown in FIG. 2, there is no neuron stimulated or excited so that the system makes a "don't know" answer. Then, if the system is made to learn that the input pattern P1 is to be in the class A, a neuron N1 is generated in the intermediate layer and also another neuron is generated in the output layer. The neuron N1 in the intermediate layer is adapted to be stimulated by any pattern of a circular region (hereafter sometimes referred to as a first circular region) having a center coincident with the pattern P1 and having a radius r1. The neuron in the output layer is adapted to indicate that an input pattern is in the class A. Therefore, in the case where an input pattern to the system is in this circular region, the system comes to answer that the input pattern is in the class A.

Figure 3:
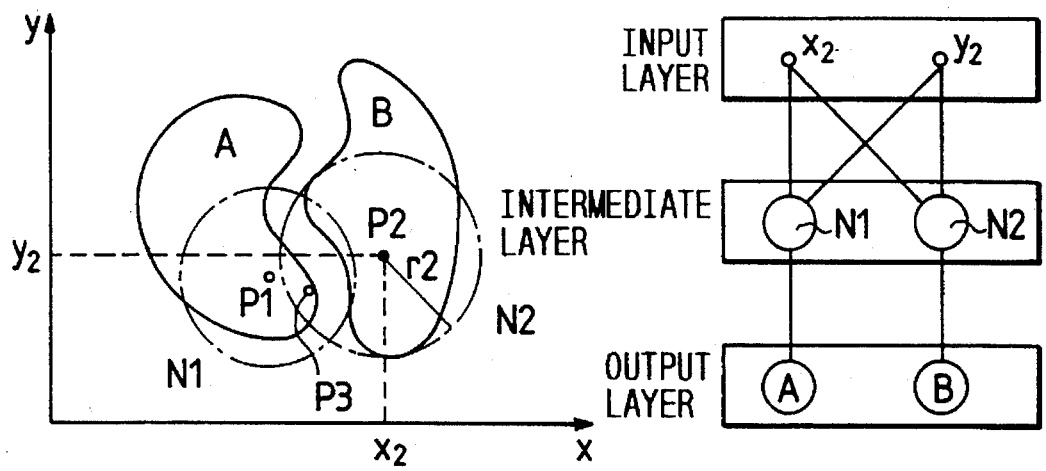

Subsequently, when another input pattern P2 which should be in the class B is inputted into the input layer as shown in FIG. 3, there is no neuron stimulated or excited so that the system makes a "don't know" answer. Then, if the system is made to learn that the input pattern P2 is to be in the class B, a neuron N2 is generated in the intermediate layer and also another neuron is generated in the output layer. The neuron N2 in the intermediate layer is adapted to be stimulated by any pattern of a circular region (hereafter sometimes referred to as a second circular region) having a center coincident with the pattern P2 and having a radius r2. The neuron in the output layer is adapted to indicate that an input pattern is in the class B. Therefore, in the case where an input pattern to the system is in this circular region, the system comes to answer that the input pattern is in the class B.

Figure 4:
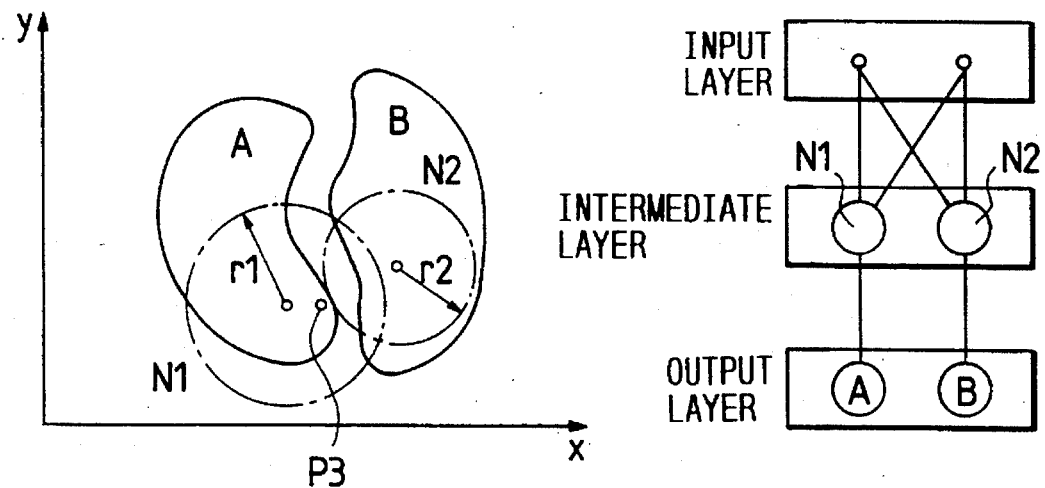

Then, if a pattern P3, which is included in both of the first and second circular regions but should be in the class A, is inputted into the input layer, both of the neurons N1 and N2 are stimulated and thus the system answers that it is uncertain which of the classes A and B includes the input pattern P3. Thereupon, the system is made to learn that the input pattern P3 is to be in the class A. As shown in FIG. 4, this learning reduces the radius r2 of the neuron N2 so that the neuron N2 will not be stimulated by the input pattern P3.

Figure 5:
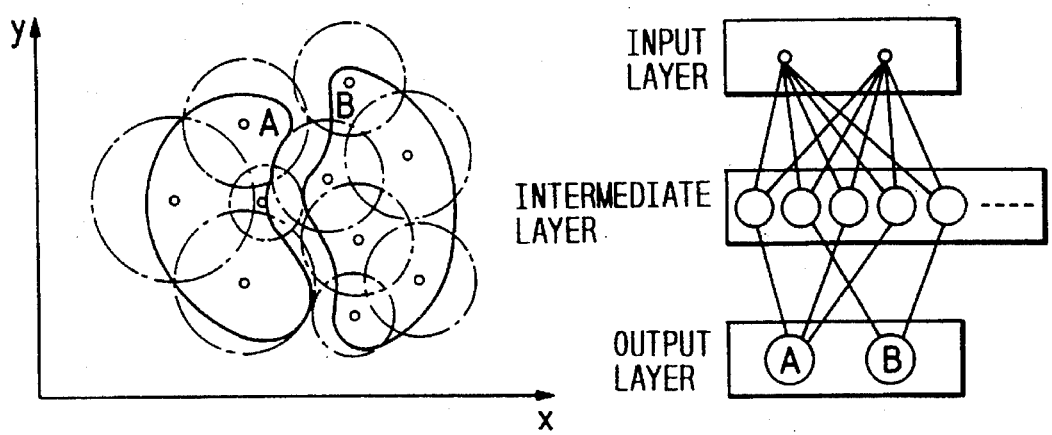

By repeating the above-mentioned processes of first inputting an input pattern into the input layer and then making the system perform a learning of the input pattern if necessary, many neurons having modified radii (modified thresholds) are generated in the intermediate layer as shown in FIG. 5. The system having a well-completed neural network can classify arbitrary input patterns (namely, arbitrary patterns of an input space) into the classes A and B.

The prior art pattern classification system using the RCE model has the following problems. Each time a learning is executed, a new unit (neuron) is generated in the intermediate layer so that the total number of the units (neurons) is increased and additional weighting factors of connection of the units (neurons) are generated. The generated units (neurons) never disappear. Accordingly, as a learning is executed periodically, an amount of data representing the units (neurons) and the weighting factors increases. Thus, a memory having a large capacity is necessary to store such data. Further, when pattern classification environment or conditions change, the previously-generated units (neurons) become useless.

Figure 6:
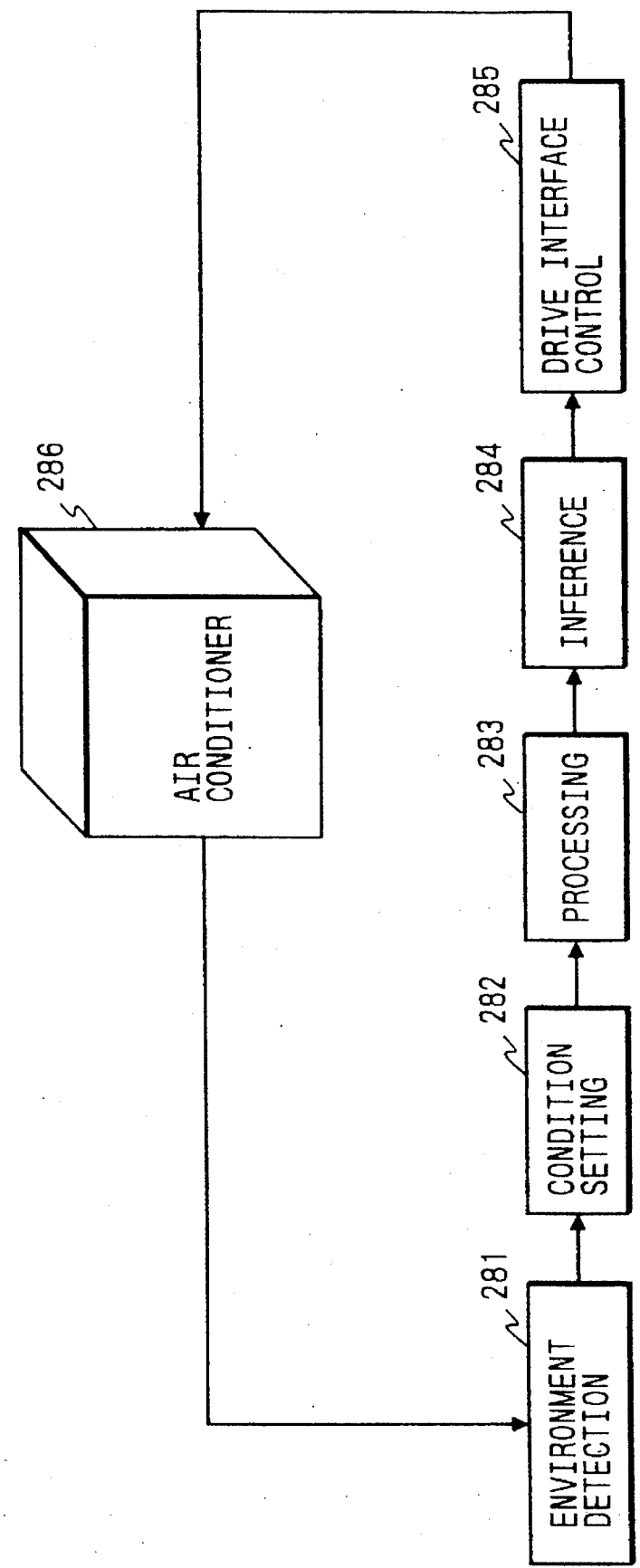
FIG. 6 is a diagram showing an operation of a prior art inference control system for an air conditioner.

A prior art inference control system for an air conditioner which is disclosed in Japanese published unexamined patent application 63-108145 will be described hereinafter. As shown in FIG. 6, the prior art inference control system includes an inference control software having an environment detecting program 281, a condition setting program 282, a data processing program 283, an inference program 284, and an interface control program 285. According to the environment detecting program 281, data representing conditions of air-conditioned environment is derived from the output signals of a temperature sensor, a humidity sensor, a sunlight sensor, and other sensors. The condition setting program 282 functions to set conditions for detecting specified facts from the environment data. According to the data processing program 283, the previously-mentioned set conditions and an air-conditioning knowledge data base are processed into sentence structure semantics codes. The inference program 284 uses a predicate logical language in inferring an optimal solution from the sentence structure semantics codes. According to the interface control program 285, control signals corresponding to the optimal solution are fed to an actuator, a motor, a control output indicator, and others in an air conditioner 286 to optically control the air conditioner 286.

In the prior art inference control system, control knowledge rules are applied to the environment data. The control knowledge rules have an if-then style. An example of such a rule is that if there occur consecutive five days where a temperature exceeds 25 degrees centigrade at a specified time, then it is decided to be summer now. A good category (mode) of air-conditioning control is selected by inference in accordance with the conclusions obtained as a result of the application of the control knowledge rules. For example, when it is decided to be summer now according to the conclusion of a control knowledge rule, a good category of air-conditioning control is selected which is intended to initially direct cool output air toward the region of the height of the user for a short time and then change the direction of the flow of cool output air upward. Control output signals for setting a target temperature, adjusting the direction of the flow of output air, selecting a mode of operation of the air conditioner, and determining other factors are generated in accordance with the selected good category.

When a user inputs an instruction of changing the control output signals, information representing such a changing instruction is stored. Then, the stored information is analyzed, and detection is made regarding user's liking by referring to the result of the analyzation. The detected user's liking is fed back to the stage control knowledge rules. Specifically, the control knowledge rules are modified in accordance with the detected user's liking. In this way, adaptive control is enabled.

The prior art inference control system for the air conditioner has the following problems. The versatility of the system tends to be insufficient. A long time and a great mount of work are necessary to generate the control knowledge rules.

DESCRIPTION OF THE FIRST PREFERRED EMBODIMENT

Figure 7:
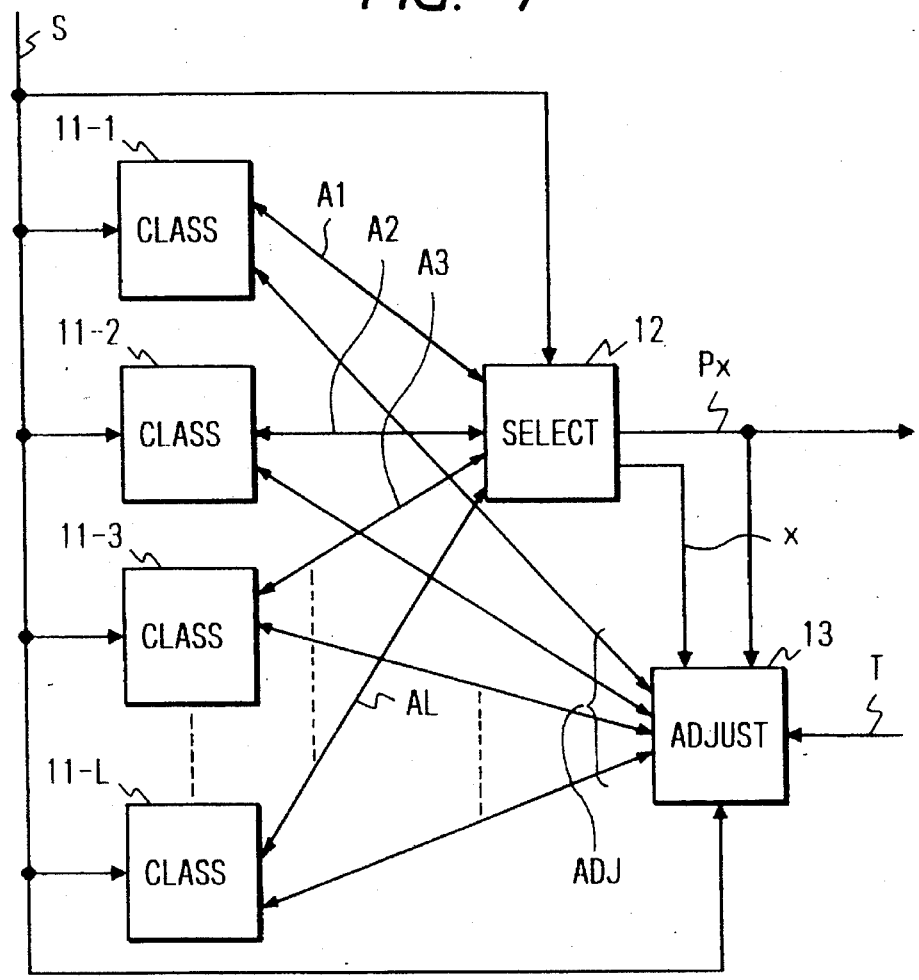
FIG. 7 is a block diagram of a pattern classification system according to a first embodiment of this invention.

With reference to FIG. 7, a pattern classification system includes L classification sections 11-1, 11-2, . . . , 11-L receiving a set of N input signals S (S1, S2, . . . , SN) composing an N-dimensional input vector representative of a changeable or variable input pattern. Each of the classification sections 11-1, 11-2, . . . , 11-L stores information of parameters for pattern classification. The classification sections 11-1, 11-2, . . . , 11-L subject the input signals S to calculations using the parameters according to predetermined procedures. When given conditions are satisfied in the calculations on the input signals S, the classification sections 11-1, 11-2, . . . , 11-L output signals A1, A2, . . . , AL' which generally contain estimation value signals.

A selection section 12 receives the L' output signals A1, A2, . . . , AL' of the classification sections 11-1, 11-2, . . . , 11-L, and selects one Ax of the L' signals A1, A2, . . . , AL' according to a predetermined procedure. Here, L' denotes a natural number equal to or smaller than the number L. The selection section 12 extracts a category signal Px from the selected signal Ax, and outputs the category signal Px to an external device (not shown) as a classification result.

An adjustment section 13 receives the category signal Px from the selection section 12. In addition, the adjustment section 13 receives a teacher signal T from an input device (not shown). The teacher signal T represents a correct category for the input pattern. Generally, the user operates the input device (not shown) to generate a suitable teacher signal T. The adjustment section 13 generates adjustment signals ADJ in response to the category signal Px and the teacher signal T. The adjustment signals ADJ are intended to adjust the parameters in the classification sections 11-1, 11-2, . . . , 11-L. The adjustment section 13 outputs the adjustment signals ADJ to the classification sections 11-1, 11-2, . . . , 11-L respectively.

It should be noted that the output signals A1, A2, . . . , AL of the classification sections 11-1, 11-2, . . . , 11-L contain counter value signals C and category signals P as estimation value signals.

Figure 8:
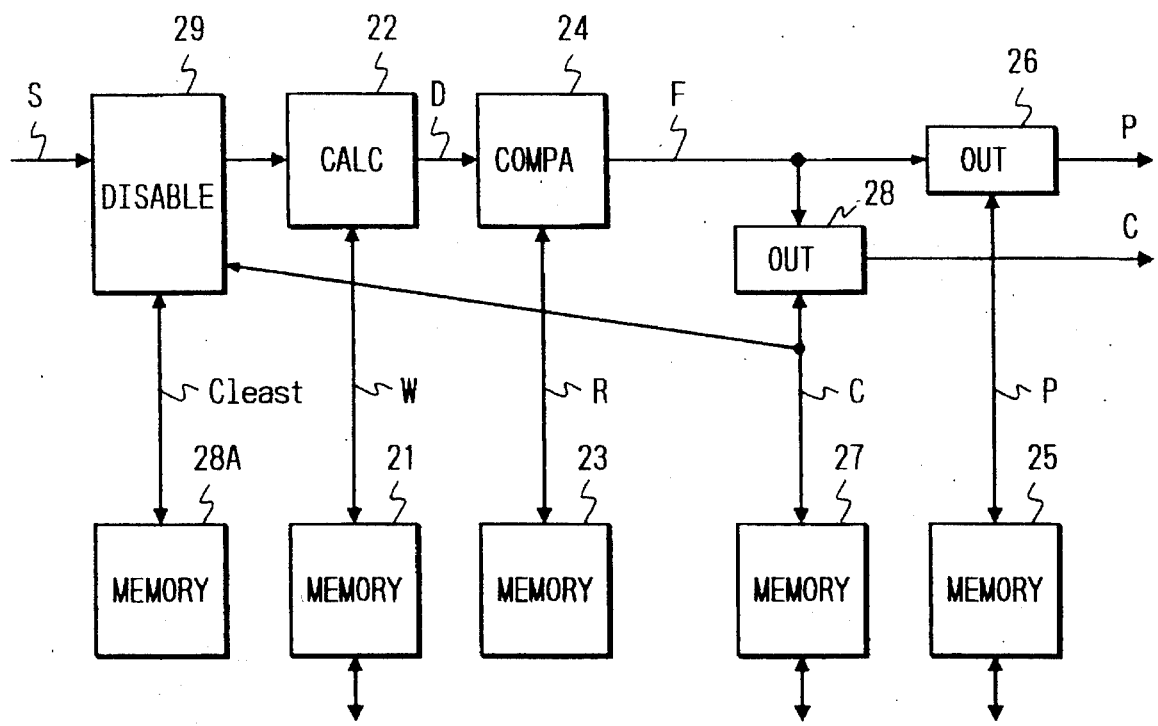
FIG. 8 is a block diagram of the classification section of FIG. 7.

The classification sections 11-1, 11-2, . . . , 11-L have equal structures, and thus the structure of only one classification section will be described hereinafter. As shown in FIG. 8, the classification section includes a rewritable memory 21 storing data representing a set of N coefficients W1, W2, . . . , WN composing a reference vector representative of a reference pattern, that is, a prototype. When a distance calculator 22 receives the input signals S via a disabling device 29, the distance calculator 22 reads out the coefficients W1, W2, . . . , WN from the memory 21. The distance calculator 22 calculates the distance between the input signals S and the coefficients W1, W2, . . . , WN. The distance calculator 22 outputs a signal D representative of the calculated distance to a comparator 24. A memory 23 stores data representing a fixed threshold level (value) R. The comparator 24 reads out the fixed threshold level R from the memory 23. The comparator 24 compares the distance signal D and the fixed threshold level R. When $D \leq R$, the comparator 24 outputs a comparison-resultant signal F being in a "true" state. When $D > R$, the comparator 24 outputs a comparison-resultant signal F being in a "false" state. A rewritable memory 25 stores a category signal P which is given by a teacher signal T during a learning process. An output device 26 receives the comparison-resultant signal F from the comparator 24. When the comparison-resultant signal F is in the "true" state, the output device 26 reads out the category signal P from the memory 25 and outputs the category signal P to the subsequent stage. When the comparison-resultant signal F is in the "false" state, the output device 26 inhibits the outputting of the category signal P. A rewritable memory 27 stores a counter signal C which generally represents the pattern classification reliability of the present classification section. An output device 28 receives the comparison-resultant signal F from the comparator 24. When the comparison-resultant signal F is in the "true" state, the output device 28 reads out the counter signal C from the memory 27 and outputs the counter signal C to the subsequent stage. When the comparison-resultant signal F is in the "false" state, the output device 28 inhibits the outputting of the counter signal C. A memory 28A stores data representing a reference lower limit Cleast of the counter value C. The disabling device 29 receives the input signals S. In addition, the disabling device 29 receives the counter lower limit Cleast from the memory 28A. Furthermore, the disabling device 29 receives the counter signal C from the memory 27. When the counter value C is equal to or smaller than the lower limit Cleast, the disabling device 29 inhibits the transmission of the input signals S to the distance calculator 22 to disable the present classification section. Otherwise, the disabling device 29 permits the transmission of the input signals S to the distance calculator 22 to enable the present classification section.

Figure 9:
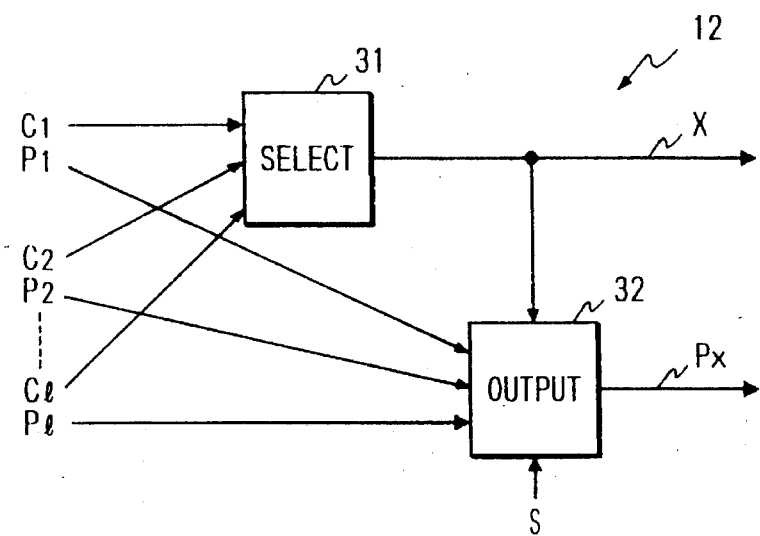
FIG. 9 is a block diagram of the selection section of FIG. 7.

As shown in FIG. 9, the selection section 12 includes a selector 31 and an output device 32. The selector 31 receives the L' counter signals C1, C2, . . . , CL' from the classification sections 11-1, 11-2, . . . , 11-L, and selects the maximum counter signal from among the counter signals C1, C2, . . . , CL'. The selector 31 outputs a label signal "x", which corresponds to the selected maximum counter signal, to the subsequent stage as an output signal So. In the absence of all the output signals A1, A2, . . . , AL of the classification sections 11-1, 11-2, . . . , 11-L in response to the input signals S, the selector 31 outputs a signal So representative of "unknown" to the subsequent stage. The output device 32 receives the L' category signals P1, P2, . . . , PL' from the classification sections 11-1, 11-2, . . . , 11-L. In addition, the output device 32 receives the signal So from the selector 31. When the signal So represents "unknown", the output device 32 outputs the signal So to the subsequent stage as an output signal Px of the selection section 12. When the signal So does not represent "unknown", the output device 32 outputs the category signal, which corresponds to the label signal "x", to the subsequent stage as an output signal Px of the selection section 12.

Figure 10:
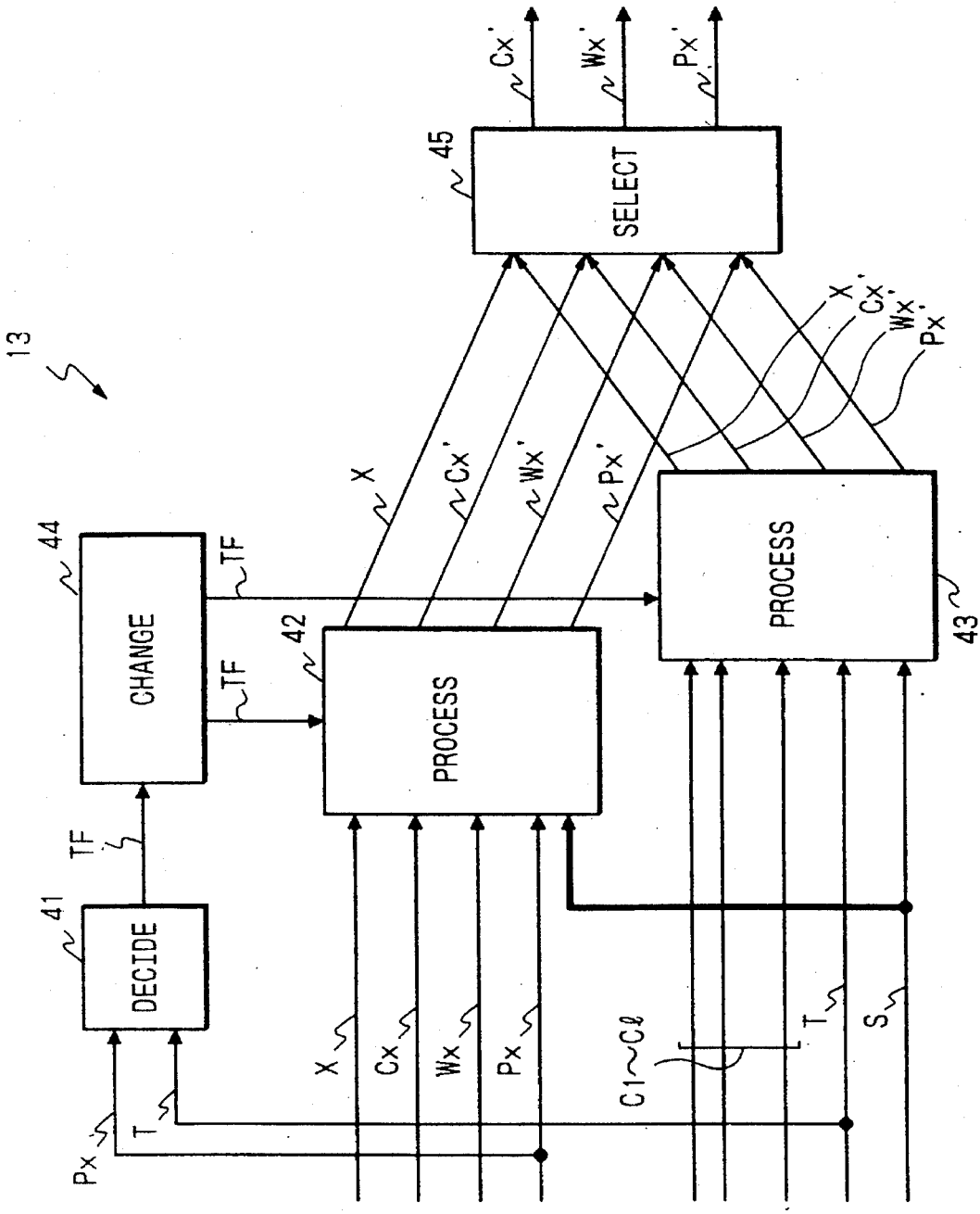
FIG. 10 is a block diagram of the adjustment section of FIG. 7.

As shown in FIG. 10, the adjustment section 13 includes a deciding device 41, processors 42 and 43, a changing device 44, and a selector 45. The deciding device 41 receives the output signal Px of the selection section 12. In addition, the deciding device 41 receives the teacher signal T. The deciding device 41 compares the selection section output signal Px and the teacher signal T. When the signal Px is equal to the signal T, that is, when the classification result is correct, the deciding device 41 outputs a signal TF being in a "true" state. When the signal Px is different from the signal T, that is, when the classification result is wrong, the deciding device 41 outputs a signal TF being in a "false" state. When the signal Px is in the "unknown" state, the deciding device 41 outputs a signal TF being in a "don't know" state. The output signal TF of the deciding device 41 is fed to the changing device 44. As will be explained later, the changing device 44 serves to control the processors 42 and 43 in response to the output signal TF of the deciding device 41. The processor 42 receives the output signal TF of the deciding device 41 via the changing device 44. The processor 42 receives the label signal "x", the category signal Px, and the input signals S. The processor 42 reads out the counter signal Cx and the coefficients Wx from the memories in the classification section which corresponds to the label signal "x". The processor 42 adjusts the counter signal Cx and the coefficients Wx into a new counter signal Cx' and new coefficients Wx' respectively in response to the output signal TF of the deciding section 41, the label signal "x", the category signal Px, and the input signals S. The processor 42 outputs the label signal "x", the counter signal Cx', the coefficients Wx', and a category signal Px' to the selector 45. The category signal Px' is equal to the category signal Px. The processor 43 receives the output signal TF of the deciding device 41 via the changing device 44. In addition, the processor 43 receives the teacher signal T and the input signals S. The processor 43 reads out the counter signals C1, C2, . . . , CL from all the classification sections 11-1, 11-2, . . . , 11-L. The processor 43 generates a label signal "x" for an adjusted classification section 11-x, an adjusted category signal Px', adjusted coefficients Wx', and an adjusted counter signal Cx' in response to the received signals. The processor 43 outputs the label signal x, the category signal Px', the coefficients Wx', and the counter signal Cx' to the selector 45. When the output signal TF of the deciding device 41 represents "true", the changing device 44 transmits the signal TF to only the processor 42. When the output signal TF of the deciding device 41 represents "don't know", the changing device 44 transmits the signal TF to only the processor 43. When the output signal TF of the deciding device 41 represents "false", the changing device 44 transmits the signal TF to both the processors 42 and 43. The selector 45 selects the output signals Cx', Wx', and Px' of the processor 42 or the output signals Cx', Wx', and Px' of the processor 43, and transmits the selected signals to the classification section 11-x corresponding to the label signal "x".

Figure 11:
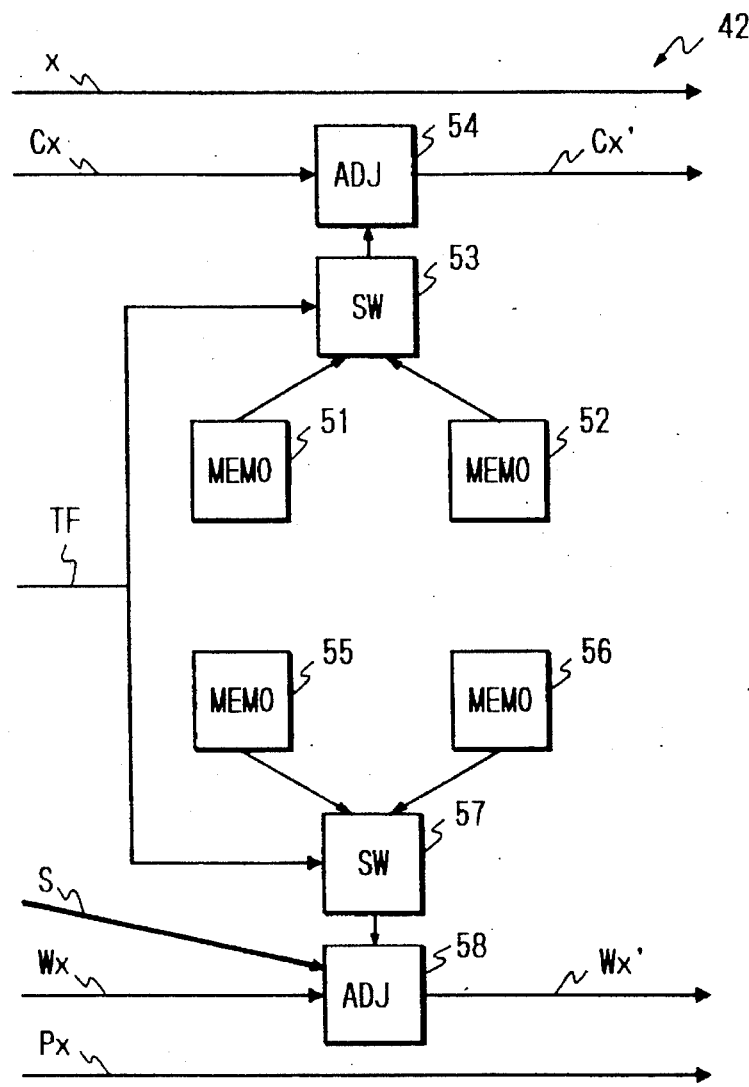
FIG. 11 is a block diagram of the true/false processor of FIG. 10.

As shown in FIG. 11, the processor 42 includes memories 51 and 52, a switch 53, an adjustment circuit 54, memories 55 and 56, a switch 57, and an adjustment circuit 58. The memory 51 stores data representing an amount DC1 of adjustment of a counter signal which is to be executed when the output signal TF of the deciding device 41 represents "true". The memory 52 stores data representing an amount DC2 of adjustment of a counter signal which is to be executed when the output signal TF of the deciding device 41 represents "false". The switch 53 receives the output signal TF of the deciding device 41. The switch 53 is connected to the memories 51 and 52. The switch 53 selects one of the counter adjustment amount signals DC1 and DC2 as a final counter adjustment amount signal DC in response to the output signal TF of the deciding device 41. The switch 53 outputs the selected counter adjustment amount signal DC to the adjustment circuit 54. Specifically, when the signal TF represents "true", the switch 53 reads out the counter adjustment amount signal DC1 from the memory 51 and transmits the signal DC1 to the adjustment circuit 54 as a final counter adjustment mount signal DC. When the signal TF represents "false", the switch 53 reads out the counter adjustment mount signal DC2 from the memory 52 and transmits the signal DC2 to the adjustment circuit 54 as a final counter adjustment mount signal DC. The adjustment circuit 54 receives the counter signal Cx corresponding to the label signal "x". The adjustment circuit 54 adjusts and modifies the counter signal Cx into a new counter signal Cx' in response to the counter adjustment mount signal DC. The adjustment circuit 54 outputs the new counter signal Cx' to the subsequent stage. The memory 55 stores data representing an amount DW1 of adjustment of coefficients which is to be executed when the output signal TF of the deciding device 41 represents "true". The memory 56 stores data representing an mount DW2 of adjustment of coefficients which is to be executed when the output signal TF of the deciding device 41 represents "false". The switch 57 receives the output signal TF of the deciding device 41. The switch 57 is connected to the memories 55 and 56. The switch 57 selects one of the coefficient adjustment mount signals DW1 and DW2 as a final coefficient adjustment amount signal DW in response to the output signal TF of the deciding device 41. The switch 57 outputs the selected coefficient adjustment mount signal DW to the adjustment circuit 58. Specifically, when the signal TF represents "true", the switch 57 reads out the coefficient adjustment amount signal DW1 from the memory 55 and transmits the signal DW1 to the adjustment circuit 58 as a final coefficient adjustment amount signal DW. When the signal TF represents "false", the switch 57 reads out the coefficient adjustment amount signal DW2 from the memory 56 and transmits the signal DW2 to the adjustment circuit 58 as a final coefficient adjustment amount signal DW. The adjustment circuit 58 receives the coefficients Wx corresponding to the label signal "x". In addition, the adjustment circuit 58 receives the input signals S. The adjustment circuit 58 adjusts and modifies the coefficients Wx into new coefficients Wx' in response to the coefficient adjustment amount signal DW and the input signals S. The adjustment circuit 58 outputs the new coefficients Wx' to the subsequent stage. The processor 42 receives the label signal "x" and the category signal Px, and outputs the label signal "x" and the category signal Px without processing them.

Figure 12:
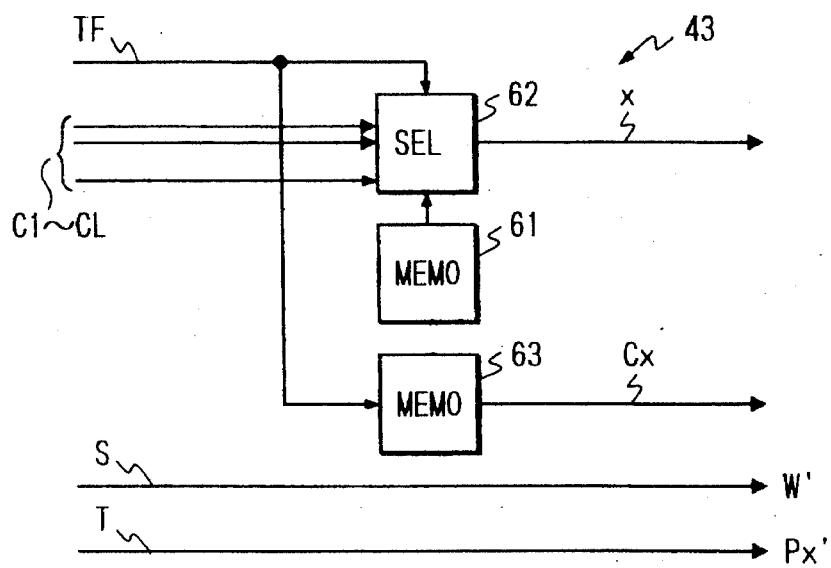
FIG. 12 is a block diagram of the generation processor of FIG. 10.

As shown in FIG. 12, the processor 43 includes a memory 61, a selection circuit 62, and a memory 63. The memory 61 stores data representing the lower limit Cleast of the counter value. The selection circuit 62 receives the lower limit Cleast from the memory 61. In addition, the selection circuit 62 receives the counter signals C1, C2, . . . , CL and the output signal TF of the deciding device 41. The selection circuit 62 detects the counter signal which is equal to or smaller than the lower limit Cleast. The selection circuit 62 recognizes the classification section corresponding to the detected counter signal. The selection circuit 62 outputs the label signal "x" corresponding to the recognized classification section. In the absence of a counter signal which is equal to or smaller than the lower limit Cleast, the selection circuit 62 selects the minimum counter signal from among the counter signals C1, C2, . . . , CL. The selection circuit 62 recognizes the classification section corresponding to the selected minimum counter signal. The selection circuit 62 outputs the label signal "x" corresponding to the recognized classification section. The memory 63 stores data representing an initial value Cstart of a counter signal C. The memory 63 receives the output signal TF of the deciding device 41. The memory 63 outputs the counter signal initial value Cstart in response to the output signal TF of the deciding device 41. The processor 43 receives the input signals S and the teacher signal T. The processor 43 transmits the input signals S to the subsequent stage as the coefficients Wx'. The processor 43 transmits the teacher signal T to the subsequent stage as the category signal Px'.

Generally, the pattern classification system operates in either a learning mode or an actual pattern classification mode. The learning mode of operation is executed first, and the actual pattern classification mode of operation is executed next. As operating conditions of the system change, the pattern classification accuracy of the system tends to be lower. To enable the system to be adapted to such a change in the operating conditions, the user instructs the system to execute the learning mode of operation again. When the learning mode of operation is completed, the classification sections 11 are designed so as to correspond to different reference patterns respectively. Reference patterns are grouped into categories. Each category includes one or more reference patterns.

The pattern classification system operates as follows. The classification sections 11-1, 11-2, . . . , 11-L wait for the occurrence of the input signals S. When the input signals S occur, the classification sections 11-1, 11-2, . . . , 11-L process the input signals S and output the process-resultant signals A1, A2, . . . , AL to the selection section 12. The selection section 12 processes the signals A1, A2, . . . , AL, and outputs the signal P representing the category which seems to contain the input patter. The adjustment section 13 compares the category signal P and the teacher signal T, and executes the adjustment process in accordance with the result of the comparison between the category signal P and the teacher signal T. The operation of the pattern classification system is basically divided into a classifying process and a learning process.

First, the classifying process will be explained hereinafter. During the classifying process, the classification section or sections 11 having counter signals C equal to or smaller than the lower limit Cleast are disabled and deactivated by internal disabling devices 29 so that they do not operate on the input signals S. During the classifying process, the N input signals S are inputted into all the classification sections 11-1, 11-2, ..., 11-L, and are processed by only the active (enabled) classification sections. In each of the active classification sections, the distance calculator 22 calculates the distance D between the input signals S (S1, S2, ..., SN) and the coefficients W1, W2, ..., WN fed from the memory 21. Specifically, the calculated distance D is given as follows.

$$D = \left\{ \sum_{i=1}^{N} (Si - Wi)^2 \right\}^{1/2}$$

The distance calculator 22 outputs a signal representative of the calculated distance D to the comparator 24. The comparator 24 compares the distance signal D and the fixed threshold level R fed from the memory 23. When $D \leq R$, the comparator 24 outputs a comparison-resultant signal F being in a "true" state. When $D > R$, the comparator 24 outputs a comparison-resultant signal F being in a "false" state. The comparison-resultant signal F is applied to the output devices 26 and 28. When the output device 26 receives the "true" signal F, the output device 26 transmits the category signal P from the memory 25 to the subsequent stage. When the output device 28 receives the "true" signal F, the output device 28 transmits the counter signal C from the memory 27 to the subsequent stage. In this way, L' active classification sections among the classification sections 11-1, 11-2, ..., 11-L output L' category signals P1, P2, ..., PL' and L' counter signals C1, C2, ..., CL'. The output signals of the classification sections 11-1, 11-2, ..., 11-L are applied to the selection section 12. The selection section 12 selects the maximum counter signal from among the counter signals C1, C2, ..., CL'. The selection section 12 selects and outputs the category signal Px corresponding to the selected maximum counter signal. When all the classification sections 11-1, 11-2, ..., 11-L do not output the category signals P and the counter signals C, the selection section 12 outputs the signal Px representing "unknown". In this way, one category or "unknown" is selected as a classification result responsive to the input signals S.

During the learning process, the adjustment section 13 compares the selection section output signal Px and the teacher signal T. Three different steps are taken in dependence upon the state of the signal Px and the result of the comparison between the signals Px and T. Specifically, when the signal Px is in the "unknown" state, a step matching to "don't know" is taken. When the signal Px is equal to the signal T, a step matching to "true" is taken. When the signal Px is different from the signal T, a step matching to "false" is taken. In the case of "don't know", the adjustment section 13 sets the counter signal C equal to the initial value Cstart and sets the coefficients W equal to the input signals S in the classification section 11 related to the counter signal C being equal to or smaller than the lower limit Cleast. When a classification section 11 having a counter signal C equal to or smaller than the lower limit Cleast is absent, the adjustment section 13 sets the counter signal C equal to the initial value Cstart and sets the coefficients W equal to the input signals S in the classification section 11 related to the minimum counter signal among the counter signals C1, C2, ..., CL. In the case of "true", the adjustment section 11 adds the adjustment amount DC1 to the counter signal C of the selected classification section 11-x, and adjusts the coefficients Wx in the selected classification section 11-x in accordance with the adjustment amount DW1. In the case of "false", the adjustment section 11 subtracts the adjustment amount DC2 from the counter signal C of the selected classification section 11-x, and adjusts the coefficients Wx in the selected classification section 11-x in accordance with the adjustment amount DW2. When a counter signal becomes equal to or smaller than the lower limit Cleast, the related classification section 11 is disabled and deactivated. During a later period, the deactivated classification section 11 continues to be unused until the deactivated classification section 11 is returned to the active state by the processing in the case of "don't know" or "false". In the case of "false", when a classification section 11 having a counter signal C equal to or smaller than the lower limit Cleast is absent, the adjustment section 13 sets the counter signal C equal to the initial value Cstart and sets the coefficients W equal to the input signals S in the classification section 11 related to the minimum counter signal among the counter signals C1, C2, ..., CL. In the case of "true", the adjustment-resultant coefficients Wx' are given as follows.

$$Wx' = Wx + DW1(S - Wx)/|S - Wx|$$

where S denotes the input signals, and Wx denotes the original coefficients and DW1 denotes the adjustment amount. The above-mentioned equation means that the coefficients W are moved toward the input signals S by the fixed distance DW1. In the case of "false", the adjustment-resultant coefficients Wx' are given as follows.

$$Wx' = Wx - DW2(S - Wx)/|S - Wx|$$

where S denotes the input signals, and Wx denotes the original coefficients and DW2 denotes the adjustment mount. The above-mentioned equation means that the coefficients W are moved toward the input signals S by the fixed distance DW2.

Under initial conditions of the pattern classification system, the counter signals C of the classification sections 11-1, 11-2, ..., 11-L are set to the lower limit Cleast. The pattern classification system is started (the learning mode of operation of the system is started) from these initial conditions. The pattern classification system outputs a signal of "don't know" in response to a first input signal S, and then one of the classification sections 11-1, 11-2, ..., 11-L is activated during the subsequent learning process.

DESCRIPTION OF THE SECOND PREFERRED EMBODIMENT

Figure 13:
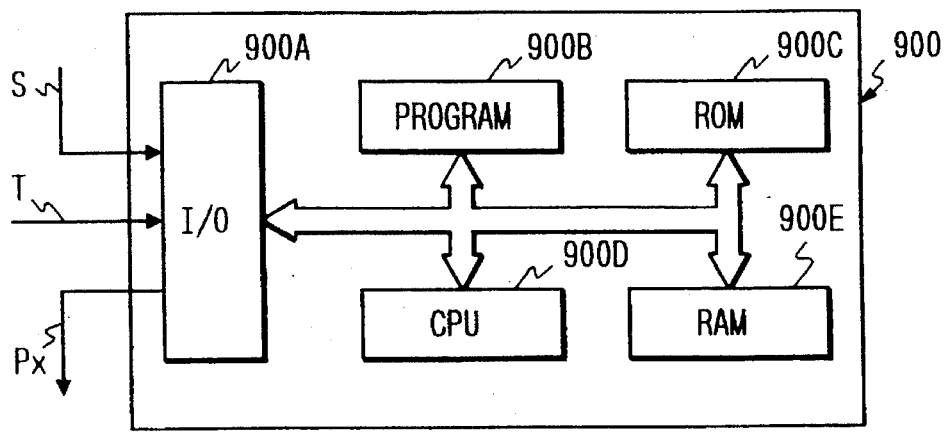
FIG. 13 is a block diagram of a pattern classification system according to a second embodiment of this invention.

FIG. 13 shows a second embodiment of this invention which is similar to the embodiment of FIGS. 7–12 except for design changes described later.

Figure 14:
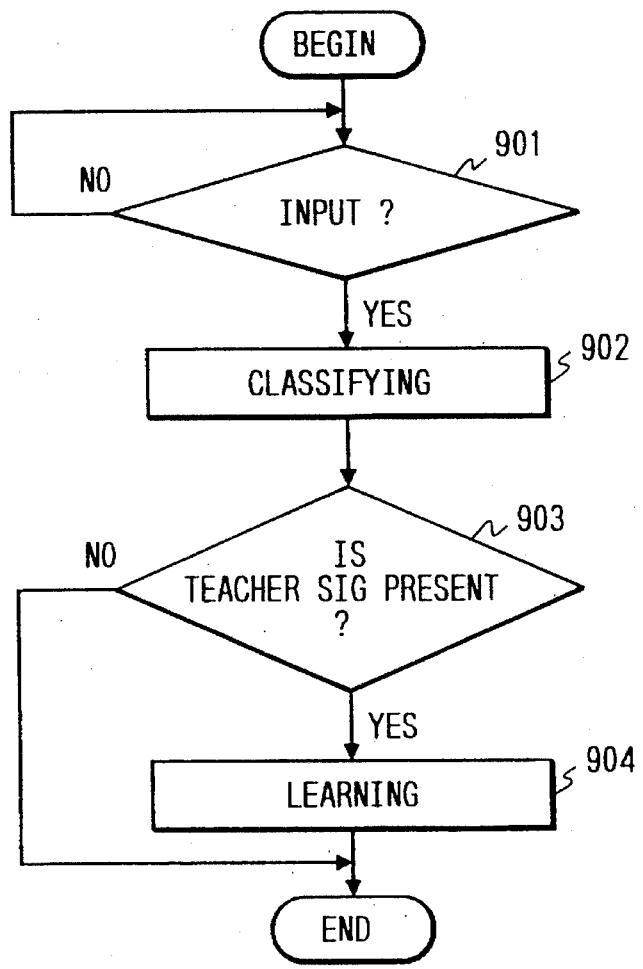
FIG. 14 is a flowchart of a program operating the computer of FIG. 13.

With reference to FIG. 13, a pattern classification system includes a computer 900 having a combination of an I/O port 900A, a ROM 900B, a program memory 900C, a CPU 900D, and a RAM 900E. A set of N input signals S composing an N-dimensional input vector representative of a changeable or variable input pattern is fed to the I/O port 900A of the computer 900. In addition, a teacher signal T is fed to the I/O port 900A of the computer 900 from an input device (not shown). The computer 900 processes the input signals S, and generates a category signal Px according to the processing of the input signals N. The computer 900 outputs the category signal Px to an external device (not shown) via the I/O port 900A. The computer 900 operates in accordance with a program stored in the program memory 900B. FIG. 14 is a flowchart of this program. The program is periodically reiterated.

As shown in FIG. 14, a first block 901 of the program decides whether or not the input signals S are received. When the input signals S are decided to be not received, the first block 901 is repeated again. When the input signals S are decided to be received, the program advances to a next block 902. In this way, the block 901 serves to wait for the occurrence of the input signals S. The block 902 executes a classifying process. A block 903 following the block 902 decides whether a teacher signal T is present or absent. When the teacher signal T is decided to be absent, the program advances from the block 903 and then the current execution cycle of the program ends. When the teacher signal T is decided to be present, the program advances from the block 903 to a block 904. The block 904 executes a learning process. After the block 904, the current execution cycle of the program ends.

Regarding the classifying block 902, classification elements corresponding to the classification sections 11-1, 11-2, ..., 11-L of FIG. 7 are defined. The classifying block 902 includes a step of processing the input signals S, and a step of generating processing-resultant signals A1, A2, ..., AL by referring to the classification elements. The classifying block 902 includes a step of processing the signals A1, A2, ..., AL, and a step of generating a signal P representing a category which seems to contain the input pattern. The learning block 904 includes a step of comparing the category signal P and the teacher signal T, and a step of executing an adjustment process in accordance with the result of the comparison between the category signal P and the teacher signal T.

The classifying block 902 will now be further explained. In the classifying block 902, the classification element or elements having counter signals C equal to or smaller than a lower limit Cleast are disabled and deactivated so that they do not operate on the input signals S. The N input signals S are processed by referring to only the active (enabled) classification elements. Regarding each of the active classification elements, the classifying block 902 includes a step of calculating the distance D between the input signals S (S1, S2, ..., SN) and adjustable coefficients W1, W2, ..., WN. Specifically, the calculated distance D is given as follows.

$$D = \left\{ \sum_{i=1}^{N} (Si - Wi)^2 \right\}^{1/2}$$

Regarding each of the active classification elements, the classifying block 902 includes a step of comparing the calculated distance D and a fixed threshold level R. When D≦R, a comparison-resultant signal F in a "true" state is generated. When D>R, a comparison-resultant signal F in a "false" state is generated. In the case of the occurrence of the "true" signal F, a category signal P and a counter signal C are read out from the RAM 900E. In this way, L' category signals P1, P2, ..., PL' and L' counter signals C1, C2, ..., CL' are generated regarding L' active classification elements among the L classification elements. The classifying block 902 includes a step of selecting the maximum counter signal from among the counter signals C1, C2, ..., CL'. The classifying block 902 includes a step of selecting a category signal Px corresponding to the selected maximum counter signal. When all the L classification elements do not generate the category signals P and the counter signals C, a category signal Px representing "unknown" is generated. Thus, one category or "unknown" is selected as a classification result responsive to the input signals S.

The learning block 904 will now be further explained. The learning block 903 includes a step of comparing the selected category signal Px and the teacher signal T. Three different steps are taken in accordance with the state of the signal Px and the result of the comparison between the signals Px and T. Specifically, when the signal Px is in the "unknown" state, a step matching to "don't know" is taken. When the signal Px is equal to the signal T, a step matching to "true" is taken. When the signal Px is different from the signal T, a step matching to "false" is taken. In the case of "don't know", the learning block 904 sets the counter signal C equal to the initial value Cstart and sets the coefficients W equal to the input signals S in the classification element related to the counter signal C being equal to or smaller than the lower limit Cleast. When a classification element having a counter signal C equal to or smaller than the lower limit Cleast is absent, the learning block 904 sets the counter signal C equal to the initial value Cstart and sets the coefficients W equal to the input signals S in the classification element related to the minimum counter signal among the counter signals C1, C2, ..., CL. In the case of "true", the learning block 904 adds an adjustment mount DC1 to the counter signal C of the selected classification element, and adjusts the coefficients Wx in the selected classification element in accordance with an adjustment amount DW1. In the case of "false", the learning block 904 subtracts an adjustment mount DC2 from the counter signal C of the selected classification element, and adjusts the coefficients Wx in the selected classification element in accordance with an adjustment amount DW2. When a counter signal becomes equal to or smaller than the lower limit Cleast, the related classification element is disabled and deactivated. During a later period, the deactivated classification element continues to be unused until the deactivated classification element is returned to the active state by the processing in the case of "don't know" or "false". In the case of "false", when a classification element having a counter signal C equal to or smaller than the lower limit Cleast is absent, the learning block 904 sets the counter signal C equal to the initial value Cstart and sets the coefficients W equal to the input signals S in the classification element related to the minimum counter signal among the counter signals C1, C2, ..., CL. In the case of "true", the adjustment-resultant coefficients Wx' are given as follows.

$$Wx' = Wx + DW1(S - Wx)/|S - Wx|$$

where S denotes the input signals, and Wx denotes the original coefficients and DW1 denotes the adjustment mount. The above-mentioned equation means that the coefficients W are moved toward the input signals S by the fixed distance DW1. In the case of "false", the adjustment-resultant coefficients Wx' are given as follows.

$$Wx' = Wx - DW2(S - Wx)/|S - Wx|$$

where S denotes the input signals, and Wx denotes the original coefficients and DW2 denotes the adjustment amount. The above-mentioned equation means that the coefficients W are moved toward the input signals S by the fixed distance DW2.

Under initial conditions of the pattern classification system, the counter signals C of the L classification elements are set to the lower limit Cleast. The pattern classification system is started from these initial conditions. The pattern classification system outputs a signal of "don't know" in response to a first input signal S, and then one of the L classification elements is activated during the subsequent learning process.

DESCRIPTION OF THE THIRD PREFERRED EMBODIMENT

Figure 15:
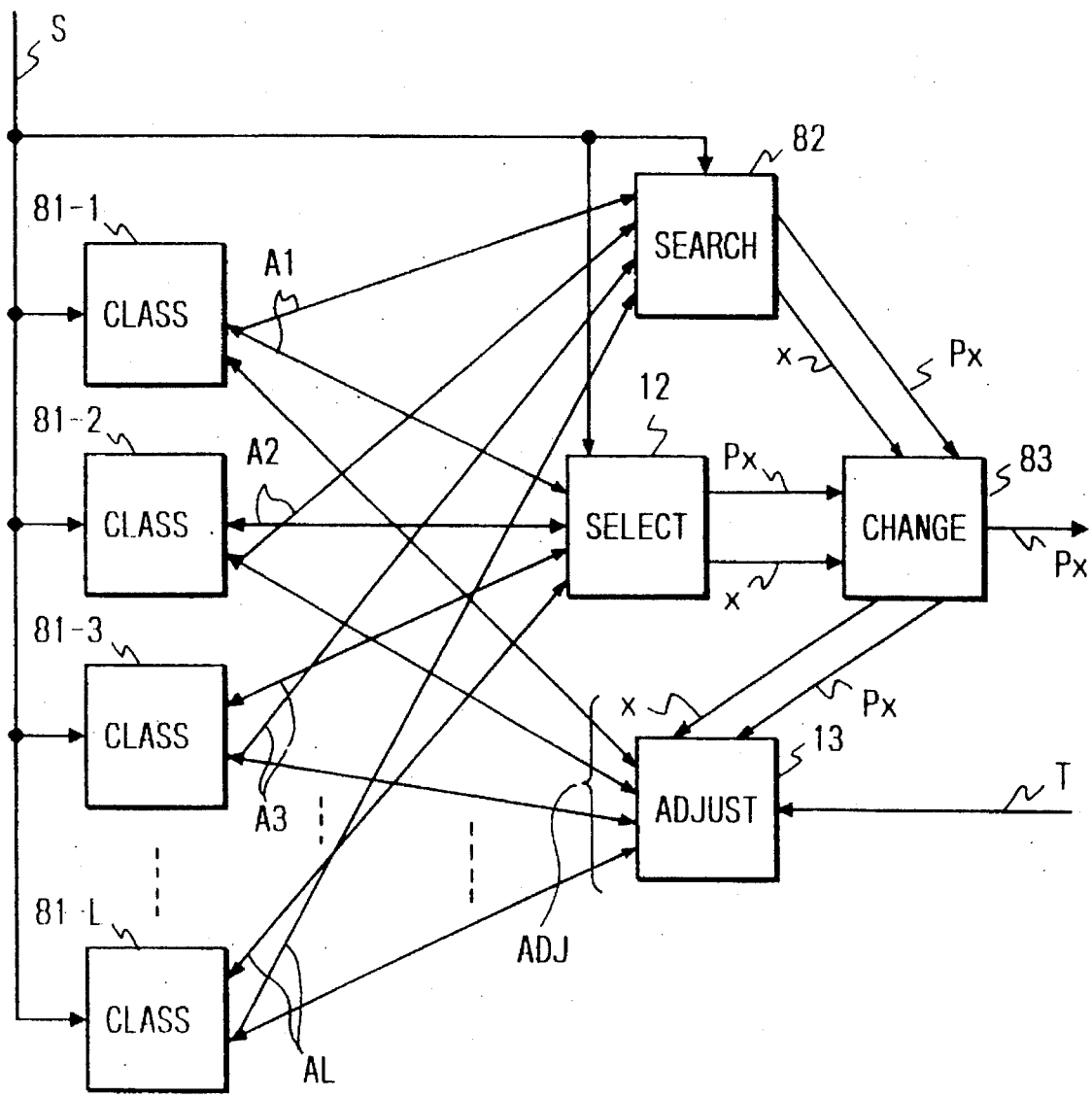
FIG. 15 is a block diagram of a pattern classification system according to a third embodiment of this invention.

FIG. 15 shows a third embodiment of this invention which is similar to the embodiment of FIGS. 7–12 except for design changes described later.

With reference to FIG. 15, a pattern classification system includes L classification sections 81-1, 81-2, . . . , 81-L receiving a set of input signals S composing an N-dimensional input vector representative of a changeable or variable input pattern. Each of the classification sections 81-1, 81-2, . . . , 81-L stores information of parameters for pattern classification. The classification sections 81-1, 81-2, . . . , 81-L subject the input signals S to calculations using the parameters according to predetermined procedures. The classification sections 81-1, 81-2, . . . , 81-L generate signals A1, A2, . . . , AL in accordance with the results of the calculations. The classification sections 81-1, 81-2, . . . , 81-L output the signals A1, A2, . . . , AL. The output signals A1, A2, . . . , AL of the classification sections 81-1, 81-2, . . . , 81-L include category signals P1, P2, . . . , PL, counter signals C1, C2, . . . , CL, and distance signals D1, D2, . . . , DL.

A selection section 12 receives the L' output signals A1, A2, . . . , AL' of the classification sections 81-1, 81-2, . . . , 81-L, and selects one Ax of the L' signals A1, A2, . . . , AL' according to a predetermined procedure. Here, L' denotes a natural number equal to or smaller than the number L. The selection section 12 extracts a category signal Px and a label signal "x" from the selected signal Ax, and outputs the extracted category signal Px and the extracted label signal "x" to an output change section 83. When all the classification sections 81-1, 81-2, . . . , 81-L do not output counter signals C, the selection section 12 outputs an "unknown" signal Px.

An adjustment section 13 receives a category signal Px and a label signal "x" from the output change section 83. In addition, the adjustment section 13 receives a teacher signal T from an external device (not shown). The adjustment section 13 generates adjustment signals ADJ in response to the category signal Px, the label signal "x", and the teacher signal T. The adjustment signals ADJ are intended to adjust the parameters in the classification sections 81-1, 81-2, . . . , 81-L. The adjustment section 13 outputs the adjustment signals ADJ to the classification sections 81-1, 81-2, . . . , 81-L respectively.

A search section 82 receives the L output signals A1, A2, . . . , AL of the classification sections 81-1, 81-2, . . . , 81-L, and selects one Axmin of the L signals A1, A2, . . . , AL according to a predetermined procedure. The search section 82 extracts a category signal Pxmin and a label signal "xmin" from the selected signal Axmin, and outputs the extracted category signal Pxmin and the extracted label signal "xmin" to the output change section 83.

The output change section 83 receives the category signal Px and the label signal "x" from the selection section 12. In addition, the output change section 83 receives the category signal Pxmin and the label signal "xmin" from the search section 82. When the output signal Px from the selection section 12 is in a state other than "unknown", the output change section 83 selects the output signals Px and "x" of the selection section 12 and transmits the selected signals to the adjustment section 13. When the output signal Px from the selection section 12 is in an "unknown" state, the output change section 83 selects the output signals Pxmin and "xmin" of the search section 82 and transmits the selected signals to the adjustment section 13 as signals Px and "x" inputted thereinto.

Figure 16:
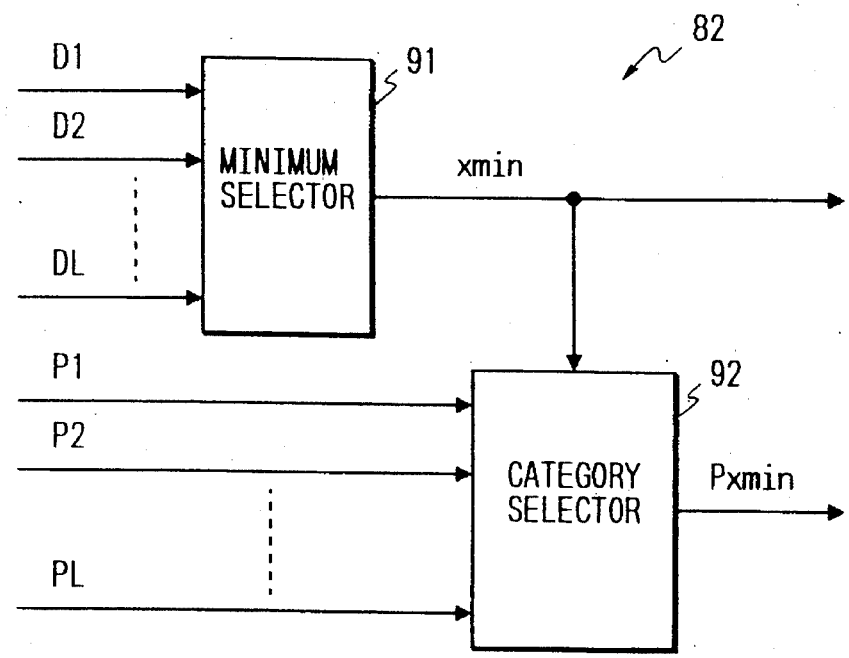
FIG. 16 is a block diagram of the search section of FIG. 15.

As shown in FIG. 16, the search section 82 includes a minimum selector 91 which receives the distance signals D1, D2, . . . , DL. The minimum selector 91 detects the minimum distance signal Dxmin among the received distance signals D1, D2, . . . , DL. The minimum selector 91 outputs a label signal "xmin" corresponding to the detected minimum distance signal Dxmin. The search section 82 also includes a selector 92 receiving the label signal "xmin" from the minimum selector 91. The selector 92 receives the category signals P1, P2, . . . , PL. The selector 92 selects a category signal Pxmin from among the received category signals P1, P2, . . . , PL which corresponds to the label signal "xmin". The selector 92 outputs the selected category signal Pxmin. The label signal "xmin" and the category signal Pxmin are outputted to the output change section 83 (see FIG. 15).

The pattern classification system operates as follows. When input signals S occur, the classification sections 81-1, 81-2, . . . , 81-L process the input signal S and output process-resultant signals A1, A2, . . . , AL which contain category signals P1, P2, . . . , PL, counter signals C1, C2, . . . , CL, and distance signals D1, D2, . . . , DL. In the case where one or more counter signals C1, C2, . . . , CL' are outputted from the classification sections 81-1, 81-2, . . . , 81-L, the selection section 12 selects the maximum counter signal Cx from among the counter signals C1, C2, . . . , CL'. The selection section 12 outputs a label signal "x" and a category signal Px which correspond to the maximum counter signal Cx. In the case where all the counter signals C1, C2, . . . , CL are not outputted from the classification sections 81-1, 81-2, . . . , 81-L, the selection section 12 outputs an "unknown" signal Px.

At the same time, the search section 82 detects the minimum distance signal Dxmin among the distance signals D1, D2, . . . , DL. The search section 82 derives a label signal "x" and a category signal Pxmin which correspond to the detected minimum distance signal Dxmin. The search section 82 outputs the label signal "xmin" and the category signal Pxmin.

When the output signal Px of the selection section 12 is in a state other than "unknown", the output change section 83 selects the output signals Px and "x" of the selection section 12 and transmits the selected signals to the adjustment section 13. When the output signal Px of the selection section 12 is in the "unknown" state, the output change section 83 selects the output signals Pxmin and "xmin" of the search section 82 and transmits the selected signals to the adjustment section 13 as signals Px and "x" inputted thereinto.

As understood from the previous description, the "unknown" signal Px is outputted only in the case where the classification sections 81-1, 81-2, . . . , 81-L remain deactivated, that is, in the case where all the counter values C are equal to or smaller than a lower limit Cleast.

DESCRIPTION OF THE FOURTH PREFERRED EMBODIMENT

Figure 17:
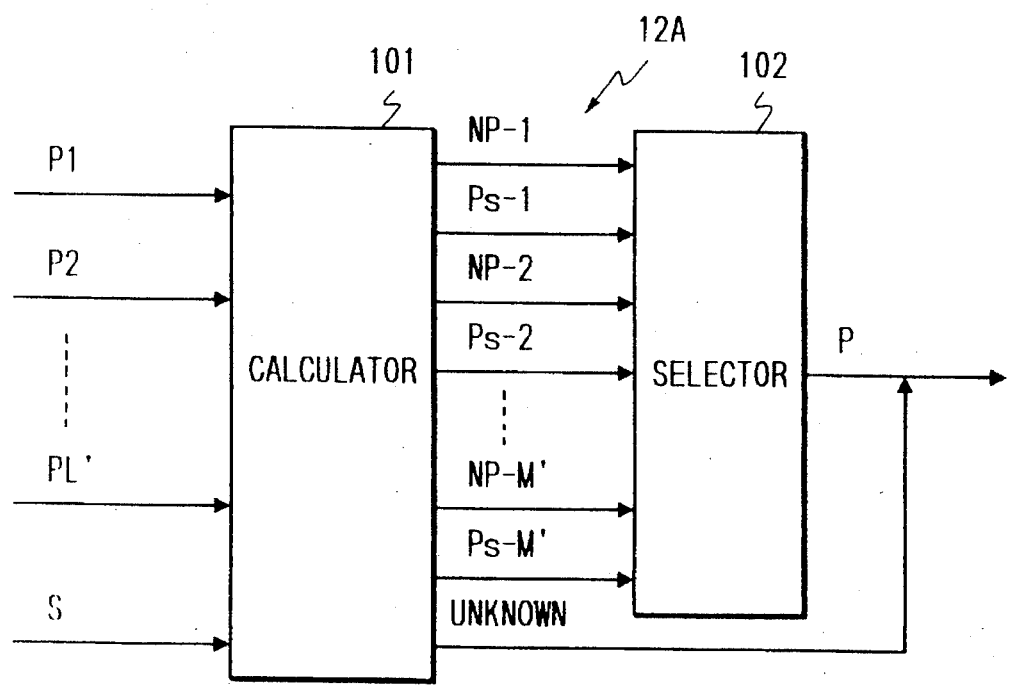
FIG. 17 is a block diagram of a selection section in a pattern classification system according to a fourth embodiment of this invention.

FIG. 17 shows a part of a fourth embodiment of this invention which is similar to the embodiment of FIGS. 7–12 except for design changes described hereinafter.

With reference to FIG. 17, a pattern classification system uses a selection section 12A instead of the selection section 12 of FIG. 7. Pattern classification is executed by using category signals P1, P2, . . . , PL contained in the output signals A1, A2, . . . , AL of classification sections 11-1, 11-2, ..., 11-L (see FIG. 7). During a learning process, adjustment is given of counter values C and coefficients W in classification sections 11-1, 11-2, ..., 11-L' which actually output category signals P1, P2, ..., PL'.

As shown in FIG. 17, the selection section 12A includes a calculator 101 and a selector 102. The calculator 101 receives L' category signals P1, P2, ..., PL' from the L classification sections 11-1, 11-2, ..., 11-L (see FIG. 7). The calculator 101 groups the received category signals P1, P2, ..., PL' into M' categories Ps-1, Ps-2, ..., Ps-M'. The calculator 101 detects the total number (input number) of category signals contained in each category. The calculator 101 outputs the detected input numbers NP-1, NP-2, ..., NP-M' and information of the corresponding categories Ps-1, Ps-2, ..., Ps-M' to the selector 102. The selector 102 selects the maximum input number NP-z from among the input numbers NP-1, NP-2, ..., NP-M'. The selector 102 selects the category Ps-z from among the categories Ps-1, Ps-2, ..., Ps-M' which corresponds to the maximum input number NP-z. The selector 102 outputs information of the selected category Ps-z to an adjustment section 13 (see FIG. 7). In the absence of all the output signals P1, P2, ..., PL of the classification sections 11-1, 11-2, ..., 11-L (see FIG. 7) regardless of the occurrence of input signals S, the calculator 101 outputs an "unknown" signal to the adjustment section 13 (see FIG. 7).

The pattern classification system operates as follows. When input signals S occur, the classification sections 11-1, 11-2, ..., 11-L (see FIG. 7) execute calculations to process the input signals S. The classification sections 11-1, 11-2, ..., 11-L output category signals P provided that given conditions are satisfied in the calculations. It is now assumed that L' classification sections 11-1, 11-2, ..., 11-L' output category signals P1, P2, ..., PL'. The selection section 12A receives the L' category signals P1, P2, ..., PL', and groups the received category signals P1, P2, ..., PL' into M' categories Ps-1, Ps-2, ..., Ps-M'. The selection section 12A detects the total number (input number) of category signals contained in each category. The selection section 12A selects the maximum input number NP-z from among the detected input numbers NP-1, NP-2, ..., NP-M' which correspond to the categories Ps-1, Ps-2, ..., Ps-M' respectively. The selection section 12A selects the category Ps-z from among the categories Ps-1, Ps-2, ..., Ps-M' which corresponds to the maximum input number NP-z. The selection section 12A outputs information of the selected category Ps-z to the adjustment section 13 (see FIG. 7). In the absence of all the output signals P1, P2, ..., PL of the classification sections 11-1, 11-2, ..., 11-L (see FIG. 7) regardless of the occurrence of input signals S, the selection section 12A outputs an "unknown" signal to the adjustment section 13 (see FIG. 7). In this way, classification of the input signal S into one category or "unknown" is executed. During the learning process, the adjustment section 13 (see FIG. 7) adjusts counter values C and coefficients W in classification sections 11-1, 11-2, ..., 11-L', which actually output category signals P1, P2, ..., PL', in response to the output signal of the selection section 12A and a teacher signal T (see FIG. 7).

DESCRIPTION OF THE FIFTH PREFERRED EMBODIMENT

Figure 18:
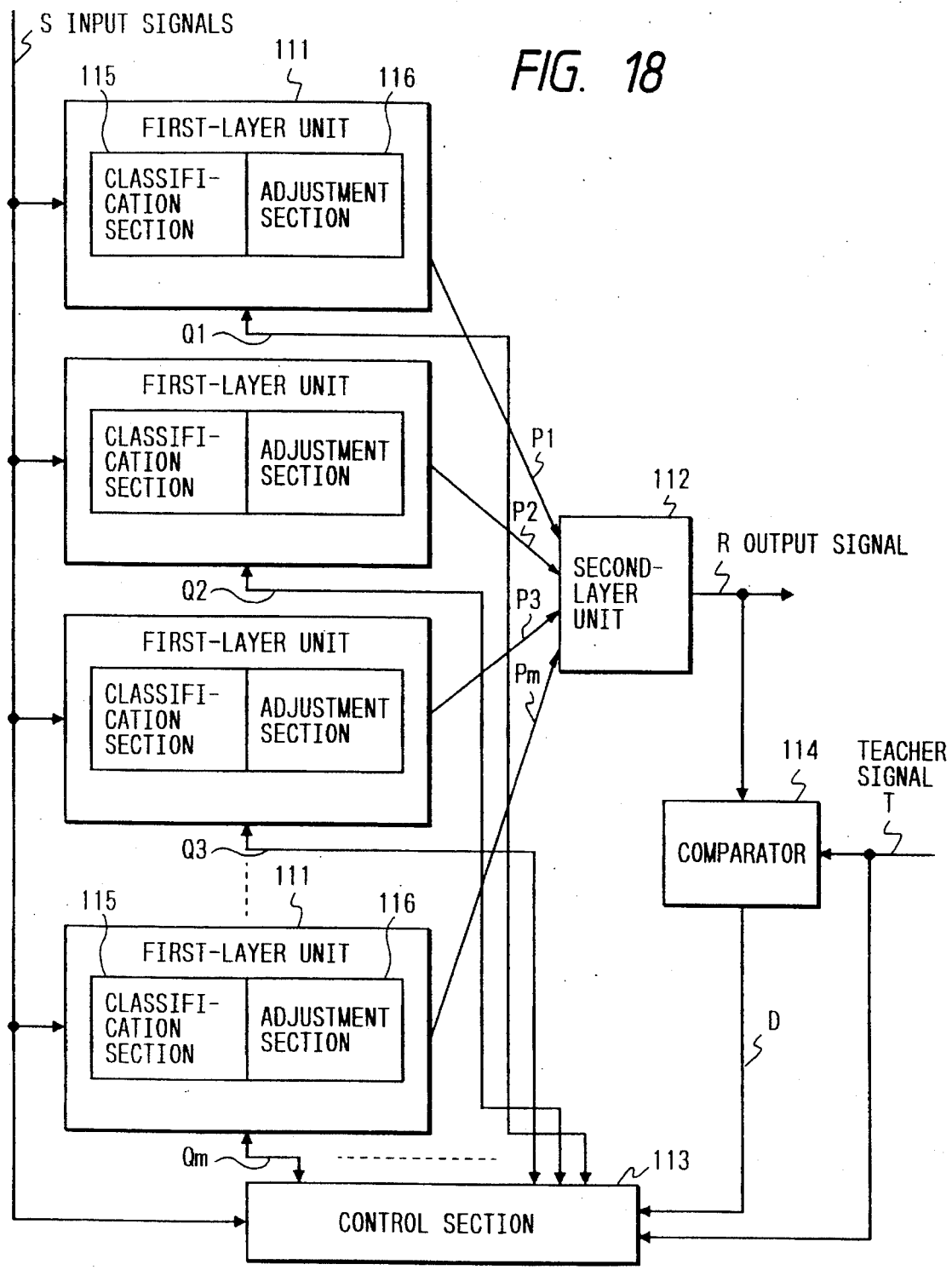
FIG. 18 is a block diagram of a pattern classification system according to a fifth embodiment of this invention.

With reference to FIG. 18, a pattern classification system includes not more than M first-layer units 111, a second-layer unit 112, a control section 113, and a comparator 114. A set of N input signals S composing an N-dimensional input vector representative of a changeable or variable input pattern is applied to the first-layer units 111. The first-layer units 111 are connected to the second-layer unit 112. The control section 113 is connected to the first-layer units 111 and the comparator 114. The control section 113 functions to control the first-layer units 111 in response to an output signal D of the comparator 114 and a teacher signal T, and in response to the output signals of the first-layer units 111. The comparator 114 is connected to the second-layer unit 112. The comparator 114 functions to compare an output signal R of the second-layer unit 112 with the teacher signal T. The teacher signal T is used for learning an input pattern. In general, the teacher signal T is outputted from an input device (not shown).

Each of the first-layer units 111 includes a classification section 115 and an adjustment section 116. The classification sections 115 of the first-layer units 111 are designed so as to correspond to classes (groups of reference patterns or prototypes) respectively. Each of the first-layer units 111 operates as follows. In each of the first-layer units 111, the classification section 115 multiplies the input signals S by coefficients respectively, or calculates the distance between the input signals S and a set of coefficients representing a reference pattern (a prototype) corresponding to a class. The classification section 115 compares the result of the multiplication or the calculated distance with a fixed threshold, generating and outputting a signal indicating whether or not the input pattern is in the corresponding class. The adjustment section 116 is controlled by the control section 113 so as to "strengthen" the associated classification section 115 when the output signal of the classification section 115 indicates that the input pattern is in the corresponding class, and so as to "weaken" the associated classification section 115 when the output signal of the classification section 115 indicates that the input pattern is not in the corresponding class. The adjustment section 116 includes an up-down counter, to which an integer K is added in the case where the associated classification section 115 should be "strengthened", and from which the integer K is subtracted in the case where the associated classification section 115 should be "weakened".

The pattern classification system sequentially executes a first classifying process, a second classifying process, and a learning process.

The first classifying process will be explained hereinafter. The first-layer units 111 are preliminary assigned to L pattern classes. For example: first to a-th first-layer units are assigned to a pattern class "1"; and (a+1)-th to b-th first-layer units are assigned to a pattern class "2"; ...; and d-th to M-th first layer units are assigned to a pattern class "L".

During the first classifying process, when input signals S occur, the first-layer units 111 execute the classification of the input pattern represented by the input signals S. The first-layer units 111 output signals P1, P2, ..., Pm representing results of the classification of the input pattern respectively. Each of the signals P1, P2, ..., Pm can be changed between "1" and "0". Each of the signals P1, P2, ..., Pm which is "1" represents that the input pattern is in the class to which the corresponding first-layer unit is assigned. Each of the signals P1, P2, ..., Pm which is "0" represents that the input pattern is not in the class to which the corresponding first-layer unit is assigned. The signals P1, P2, ..., Pm are fed from the first-layer units 111 to the second-layer unit 112 which executes a majority operation. Among the classes corresponding to the groups of the first-layer units 111 outputting the signals P1 to Pm, the class having the largest number of "1" signals is detected by the second-layer unit 112. The second-layer unit 112 outputs a signal R indicating the detected class.

During the first classifying process, each of the first-layer units 111 multiplies the input signals S by the coefficients respectively, or calculates the distance between the input signals S and a set of coefficients representing a reference pattern (a prototype) corresponding to a class. Each of the first-layer units 111 compares the result of the multiplication or the calculated distance with a fixed threshold, generating and outputting a signal indicating whether or not the input pattern is in the corresponding class. Specifically, when the result of the multiplication or the calculated distance is smaller than the fixed threshold, a related first-layer unit 111 outputs a signal indicating that the input pattern is in the corresponding class. Otherwise, the related first-layer unit 111 outputs a signal indicating that the input pattern is not in the corresponding class. Information of a first-layer unit or units 111 each outputting a signal indicating that the input pattern is in the corresponding class is transmitted to and stored into the control section 113.

The second classifying process will be explained hereinafter. The second classifying process is executed after the first classifying process. During the second classifying process, the control section 113 performs a decision regarding whether or not the input pattern is in the class corresponding to a first-layer unit or units 111 by referring to the information stored during the first classifying process. The control section 113 generates adjustment signals Q1, Q2, . . . , Qm in response to the result of the decision. The adjustment signals Q1, Q2, . . . , Qm are designed so as to control the classification sections 115 in the first-layer units 111 via the adjustment sections 116 respectively. The control section 113 outputs the adjustment signals Q1, Q2, . . . , Qm to the adjustment sections 116 of the first-layer units 111 respectively. During the second classifying process, when the input pattern is decided to be in the class corresponding to a first-layer unit or units 111, the control section 113 operates on only them. Specifically, the control section 113 operates so that the up-down counter value or values in a first-layer unit or units i 11, each of which outputs a signal indicating that the input pattern is in the corresponding class, will be increased by the integer K.

The leaning process is executed after the second classifying process. During the leaning process, the adjustment section 116 is controlled by the control section 113 so as to "weaken" the associated classification section 115 when the output signal of the classification section 115 indicates that the input pattern is not in the corresponding class. The adjustment section 116 includes an up-down counter, from which the integer K is subtracted in the case where the associated classification section 115 should be "weakened".

During the learning process, the comparator 114 receives the output signal R of the second-layer unit 112. In addition, the comparator 114 receives a teacher signal T from an external device (not shown). The teacher signal T indicates a correct class in which the input pattern represented by the input signals S is contained. The comparator 114 compares the output signal R of the secondlayer unit 112 with the teacher signal T, generating and outputting a signal D representative of the result of the comparison. The signal D can be changed among "−1", "0", and "+1". The signal D being "−1" indicates that none of the classes includes the input pattern (namely, there is no classes corresponding to the input pattern). The signal D being "0" indicates a classification error. The signal D being "+1" indicates that the signals R and T are equal.

During the learning process, the control section 113 receives the output signal D of the comparator 114. The control section 113 generates adjustment signals Q1, Q2, . . . , Qm in response to the output signal D of the comparator 114. The adjustment signals Q1, Q2, . . . , Qm are designed so as to control the classification sections 115 in the first-layer units 111 via the adjustment sections 116 respectively. The control section 113 outputs the adjustment signals Q1, Q2, . . . , Qm to the adjustment sections 116 of the first-layer units 111 respectively.

In the case where the output signal D of the comparator 114 is "+1", the control section 113 do not operate on the first-layer units 111. In the case where the output signal D of the comparator 114 is "−1", the control section 113 operates on only the first-layer unit or units 111 each outputting a signal indicating that the input pattern is in the corresponding class, and each having an up-down counter indicating a negative value. Specifically, the control section 113 sets the coefficients in such a first-layer unit or units equal to the input signals S, and resets the counter value or values therein equal to zero. In the case where the output signal D of the comparator 114 is "−1", when a first-layer unit having an up-down counter indicating a negative value is absent, the control section 113 operates on only the first-layer unit or units 111 each having an up-down counter indicating a value equal to zero or not greater than a given value Wref. Specifically, the control section 113 sets the coefficients in such a first-layer unit or units equal to the input signals S, and resets the counter value or values therein equal to zero. In the case where the output signal D of the comparator 114 is "0", the control section 113 operates on only the first-layer unit or units 111 each indicating the class other than the class corresponding to the teacher signal T. Specifically, the control section 113 operates so that the up-down counter value or values in such a first-layer unit or units will be decreased by the integer K.

Figure 19:
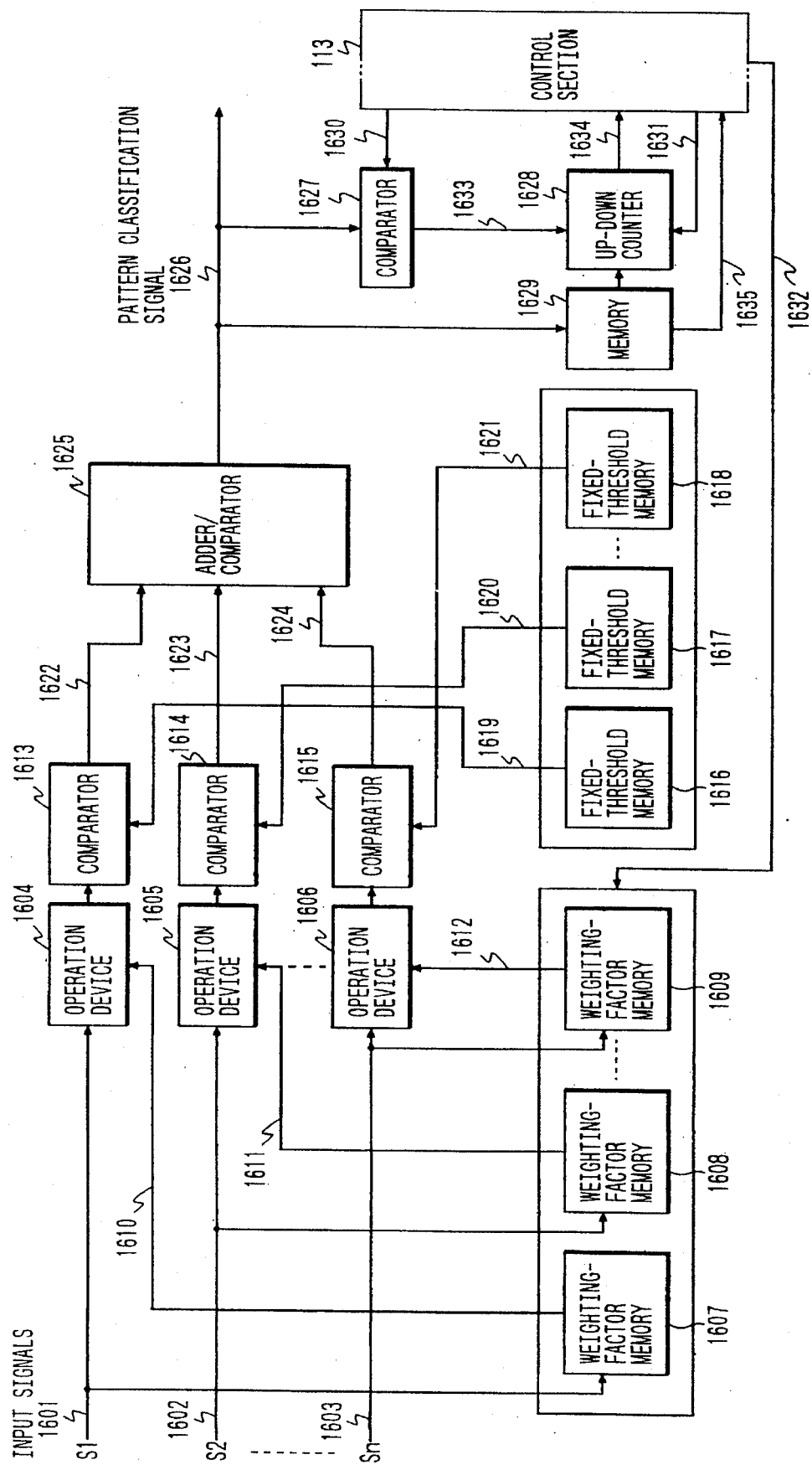
FIG. 19 is a block diagram of the first-layer unit of FIG. 18.

The first-layer units 111 have equal structures, and thus the structure of only one first-layer unit will be described in detail hereinafter. As shown in FIG. 19, the first-layer unit 111 includes operation devices 1604, 1605, and 1606.

During the first classifying process, the operation devices 1604, 1605, and 1606 multiply members 1601, 1602, and 1603 of the input signals S by coefficients 1610, 1611, and 1612 respectively. The operation devices 1604, 1605, and 1606 receive information of the coefficients 1610, 1611, and 1612 from memories 1607, 1608, and 1609. Comparators 1613, 1614, and 1615 compare the results of the multiplications with fixed thresholds 16 19, 1620, and 162 1 respectively. The comparators 1613, 1614, and 1615 receive information of the fixed thresholds 1619, 1620, and 1621 from memories 1616, 1617, and 1618. The comparators 1613, 1614, and 1615 output binary signals 1622, 1623, and 1624 which are changed between "0" and "1" in accordance with the results of the comparisons. The output signals 1622, 1623, and 1624 of the comparators 1613, 1614, and 1615 are fed to an adder/comparator 1625. The adder/comparator 1625 determines whether or not all of the output signals 1622, 1623, and 1624 of the comparators 1613, 1614, and 1615 are "1". When all of the output signals 1622, 1623, and 1624 of the comparators 1613, 1614, and 1615 are "1", the adder/comparator 1625 outputs a pattern classification signal 1626 being "1". Otherwise, the adder/comparator 1625 outputs a pattern classification signal 1626 being "0". Information representing a pattern classification signal 1626 is "1" is stored into a memory 1629. Then, the information 1635 is transmitted from the memory 1629 to the control section 113.

During the second classifying process, action similar to the above-mentioned action in the first classifying process is first executed. The control section 113 outputs an adjustment signal 1631 to an up-down counter 1628. The adjustment signal 1631 is generated on the basis of the information 1635 transmitted from the memory 1629. When the adjustment signal 1631 is "1", the value indicated by the up-down counter 1628 is increased by the integer K. Otherwise, the value indicated by the up-down counter 1628 remains unchanged. It should be noted that the up-down counter 1628 is previously initialized to a state corresponding to a negative value.

During the learning process, the control section 113 outputs a signal 1630 to a comparator 1627, and also outputs a signal 1632 to the memories 1607, 1608, and 1609. The comparator 1627 compares the pattern classification signal 1626 with the signal 1630 outputted from the control section 113. When the signal 1630 outputted from the control section 113 is "1", the comparator 1627 outputs a "1" signal 1633 to the up-down counter 1628 so that the value indicated by the up-down counter 1628 is decreased by the integer K. When the signal 1630 outputted from the control section 113 is "0", the value indicated by the up-down counter 1628 remains unchanged. In the case where the signal 1632 outputted from the control section 113 is "1", the members 1601, 1602, and 1603 of the input signals S are stored into the memories 1607, 1608, and 1609 to update and adjust the coefficients respectively. Simultaneously, the control section 113 outputs a signal 1631 to the up-down counter 1628 so that the value indicated by the up-down counter 1628 will be reset to zero or a given value. Upon the change of the up-down counter value, the up-down counter 1634 outputs a signal representative of the counter value change to the control section 113. In the case where the signal 1632 outputted from the control section 113 is "0", the coefficients stored in the memories 1607, 1608, and 1609 are not updated.

DESCRIPTION OF THE SIXTH PREFERRED EMBODIMENT

Figure 20:
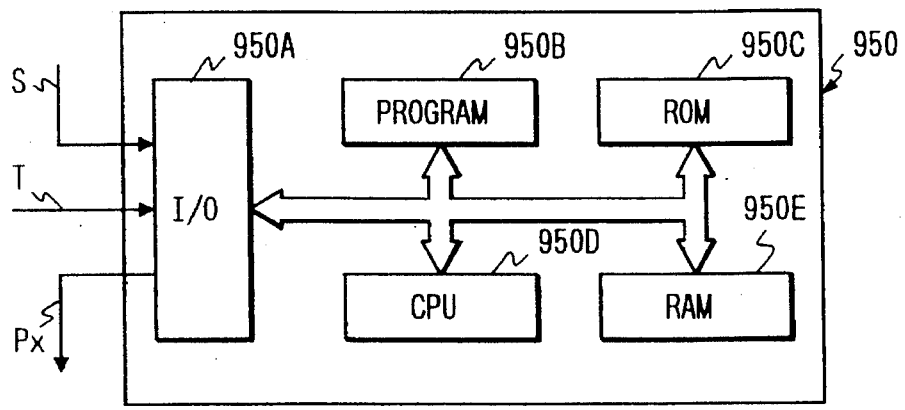
FIG. 20 is a block diagram of a pattern classification system according to a sixth embodiment of this invention.

FIG. 20 shows a sixth embodiment of this invention which is similar to the embodiment of FIGS. 18 and 19 except for design changes described later.

Figure 21:
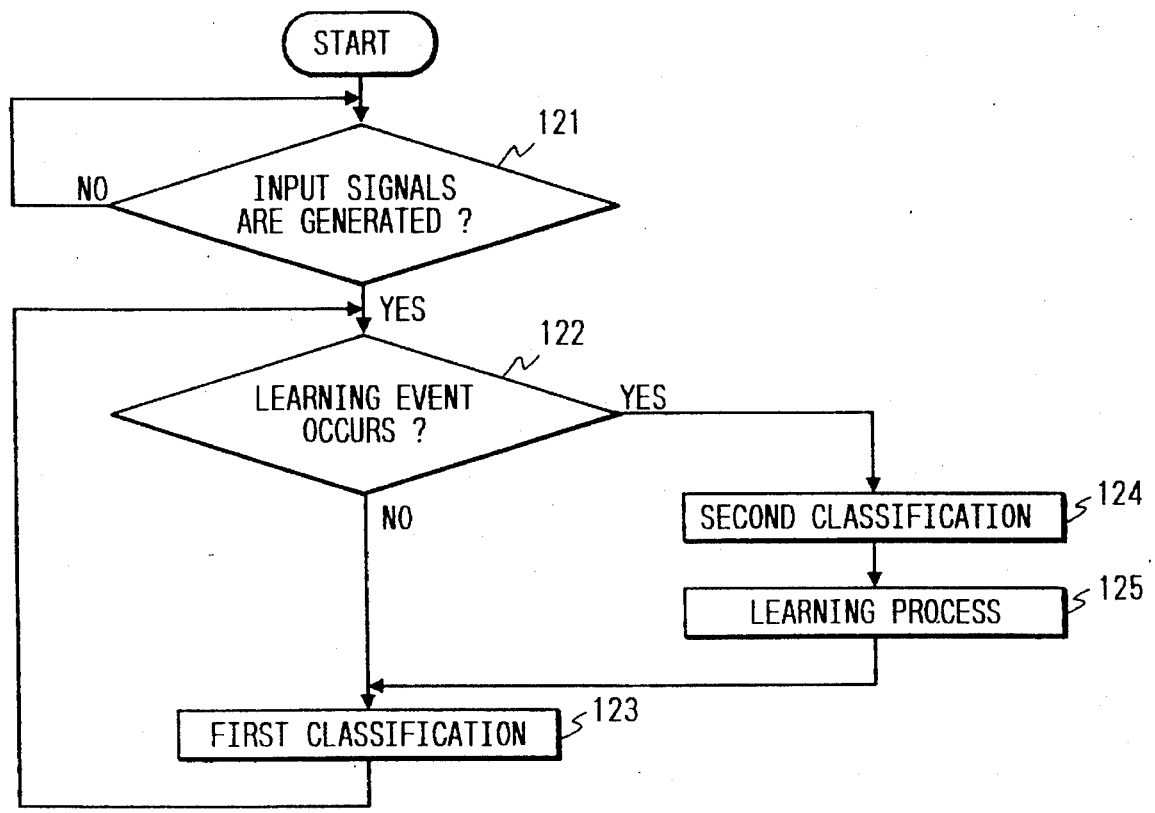
FIG. 21 is a flowchart of a program operating the computer of FIG. 20.

With reference to FIG. 20, a pattern classification system includes a computer 950 having a combination of an I/O port 950A, a program memory 950B, a ROM 950C, a CPU 950D, and a RAM 950E. A set of N input signals S composing an N-dimensional input vector representative of a changeable or variable input pattern is fed to the I/O port 950A of the computer 950. In addition, a teacher signal T is fed to the I/O port 950A of the computer 950 from an input device (not shown). The computer 950 processes the input signals S, and generates a class-representing signal R according to the processing of the input signals S. The computer 950 outputs the class-representing signal R to an external device (not shown) via the I/O port 950A. The computer 950 operates in accordance with a program stored in the program memory 950B. FIG. 21 is a flowchart of this program. The program is periodically reiterated.

As shown in FIG. 21, a first block 121 of the program decides whether or not the input signals S are received. When the input signals S are decided to be not received, the first block 121 is repeated again. When the input signals S are decided to be received, the program advances to a next block 122. In this way, the block 121 serves to wait for the occurrence of the input signals S. The block 122 decides whether or not a learning event (namely, a learning category) is present. When a learning event is decided to be present, the program advances from the block 122 to a block 124. Otherwise, the program advances from the block 122 to a block 123. Firstly, the program advances from the block 122 to the block 123. The block 123 executes a first classifying process for classifying the input pattern into classes. After the block 123, the program returns to the block 122. Because there is a learning event at this time, the program advances from the block 122 to the block 124. The block 124 executes a second classifying process. A block 125 following the block 124 executes a learning process. After the block 125, the program advances to the block 123.

Figure 22:
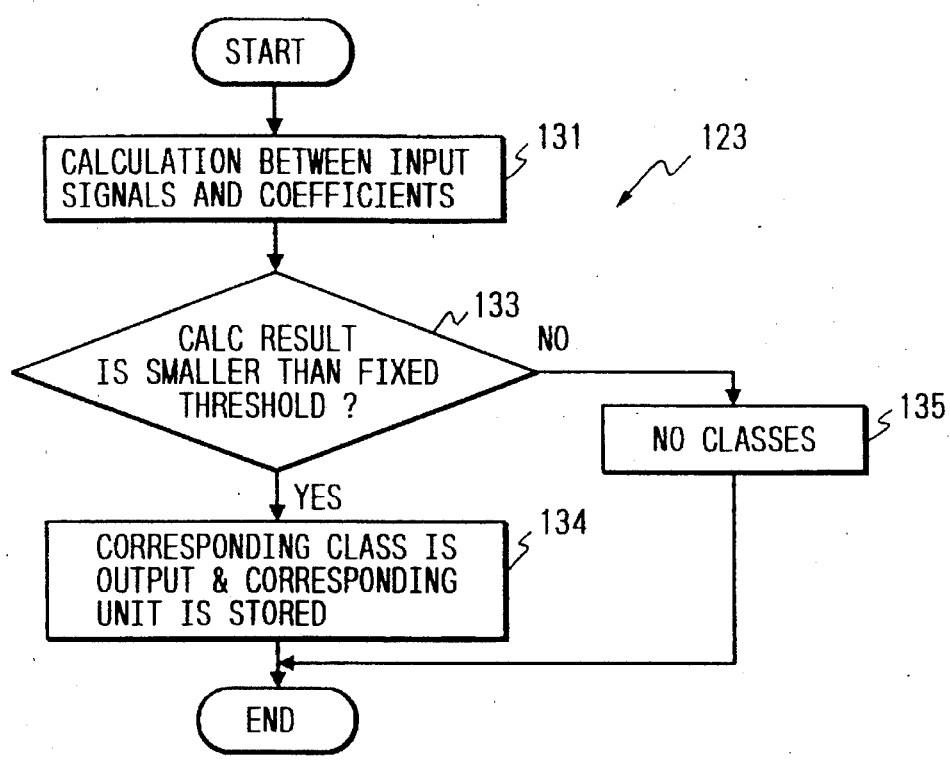
FIG. 22 is a diagram showing the internal structure of the first classifying block of FIG. 21.

Regarding the first classifying block 123, classification elements corresponding to the respective first-layer units 111 of FIG. 18 are defined. As shown in FIG. 22, the first classifying block 123 includes steps 131, 133, 134, and 135. The first step 131 executes a calculation between the input signals S and coefficients in each of the classification elements. Specifically, with respect to each of the classification elements, the first step 131 multiplies the current input signals S by coefficients respectively, or calculates the distance between the input signals S and a set of coefficients representing a reference pattern (a prototype) corresponding to a class. With respect to each of the classification elements, the step 133 following the step 13 1 compares the result of the multiplication or the calculated distance with a fixed threshold to determine whether or not the input pattern is in the class assigned to the classification element. When the result of the multiplication or the calculated distance is smaller than the fixed threshold, that is, when the input pattern is in the class assigned to the classification element, the program advances from the step 133 to the step 134. Otherwise, the program advances from the step 133 to the step 135. The step 134 stores information into the RAM 950E which represents the classification element or elements related to the class containing the input pattern. The step 135 stores information into the RAM 950E which represents there is no classification element related to the class containing the input pattern. After the steps 134 and 135, the program exits from the first classifying block 123.

The first classifying block 123 also includes a step (not shown) of generating signals P1, P2, ..., Pm representing results of the classification of the input pattern respectively. Each of the signals P1, P2, ..., Pm can be changed between "1" and "0". Each of the signals P1, P2, ..., Pm which is "1" represents that the input pattern is in the class to which the corresponding classification element is assigned. Each of the signals P1, P2, ..., Pm which is "0" represents that the input pattern is not in the class to which the corresponding classification element is assigned. Furthermore, the first classifying block 123 includes a step of executing a majority operation on the signals P1, P2, ..., Pm. Specifically, among the classes corresponding to the groups of the classification elements related to the signals P1 to Pm, the class having the largest number of "1" signals is detected. Then, a signal R indicating the detected class is generated.

Figure 23:
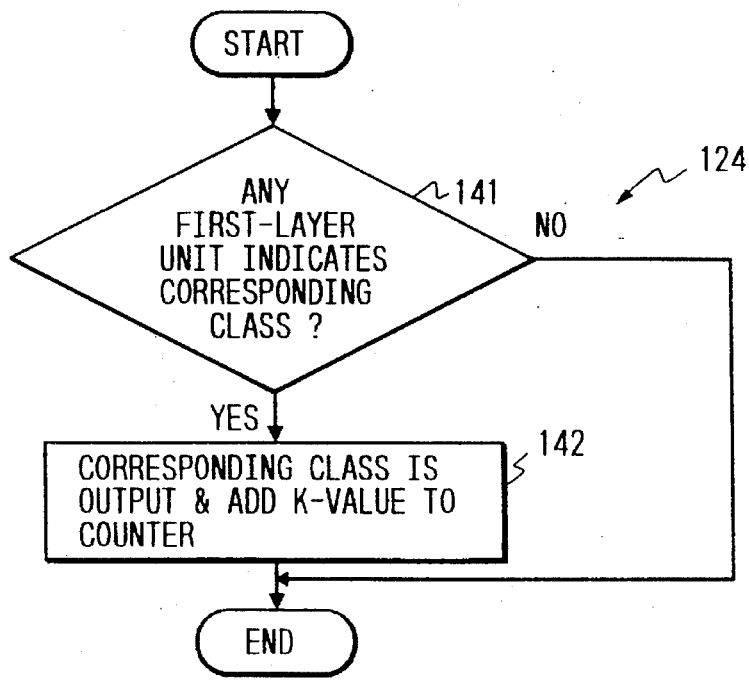
FIG. 23 is a diagram showing the internal structure of the second classifying block of FIG. 21.

As shown in FIG. 23, the second classifying block 124 includes steps 141 and 142. The first step 141 performs a decision regarding whether or not the input pattern is in the class corresponding to a classification element or elements by referring to the information which is stored by the first classifying block 123. When the input pattern is decided to be in the class corresponding to a classification element or elements, the program advances from the step 141 to the step 142. Otherwise, the program advances from the step 141 and then exits from the second classifying block 124. The step 142 executes action so that an up-down counter value or values in a classification element or elements, each of which relates to the class containing the input pattern, will be increased by the integer K. After the step 142, the program exits from the second classifying block 124.

Figure 24:
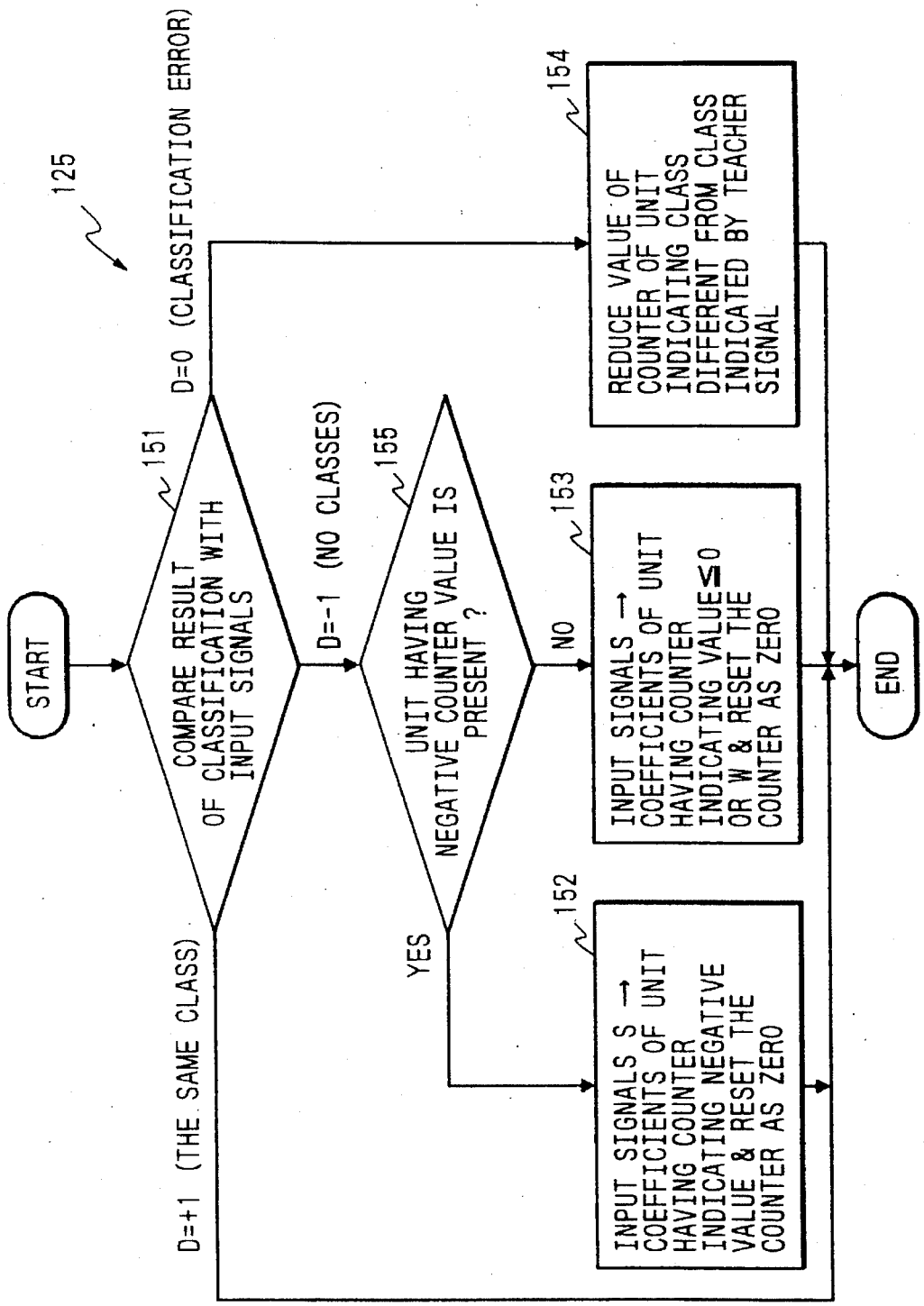
FIG. 24 is a diagram showing the internal structure of the learning block of FIG. 21.

As shown in FIG. 24, the learning block 125 includes steps 151, 152, and 153. The first step 151 refers to the detected-class signal R. In addition, the first step 151 refers to the teacher signal T which indicates a correct class in which the input pattern represented by the input signals S is contained. The first step 151 compares the detected-class signal signal R with the teacher signal T, generating a signal D representative of the result of the comparison. The signal D can be changed among "−1", "0", and "+1". The signal D being "−1" indicates that none of the classes includes the input pattern (namely, there is no classes corresponding to the input pattern). The signal D being "0" indicates a classification error. The signal D being "+1" indicates that the signals R and T are equal. When the signal D is "−1", the program advances from the step 151 to a step 155. When the signal D is "0", the program advances from the step 151 to a step 154. When the signal D is "+1", the program advances from the step 151 and exits from the learning block 125. The step 155 decides whether a classification element related to a negative up-down counter value is present or absent. When a classification element related to a negative up-down counter value is decided to be present, the program advances from the step 155 to a step 152. Otherwise, the program advances from the step 155 to a step 153. The step 152 sets the coefficients in a classification element or elements, each related to a negative up-down counter value, equal to the input signals S, and resets the counter value or values therein equal to zero. After the step 152, the program exits from the learning block 125. The step 153 sets the coefficients in the classification element or elements, each related to an up-down counter value equal to zero or not greater than a given value Wref, equal to the input signals S, and resets the counter value or values therein equal to zero. After the step 153, the program exits from the learning block 125. The step 154 operates on only the classification element or elements each indicating the class other than the class corresponding to the teacher signal T. Specifically, the step 154 executes action so that the up-down counter value or values in such a classification element or elements will be decreased by the integer K. After the step 154, the program exits from the learning block 125.

DESCRIPTION OF THE SEVENTH PREFERRED EMBODIMENT

Figure 25:
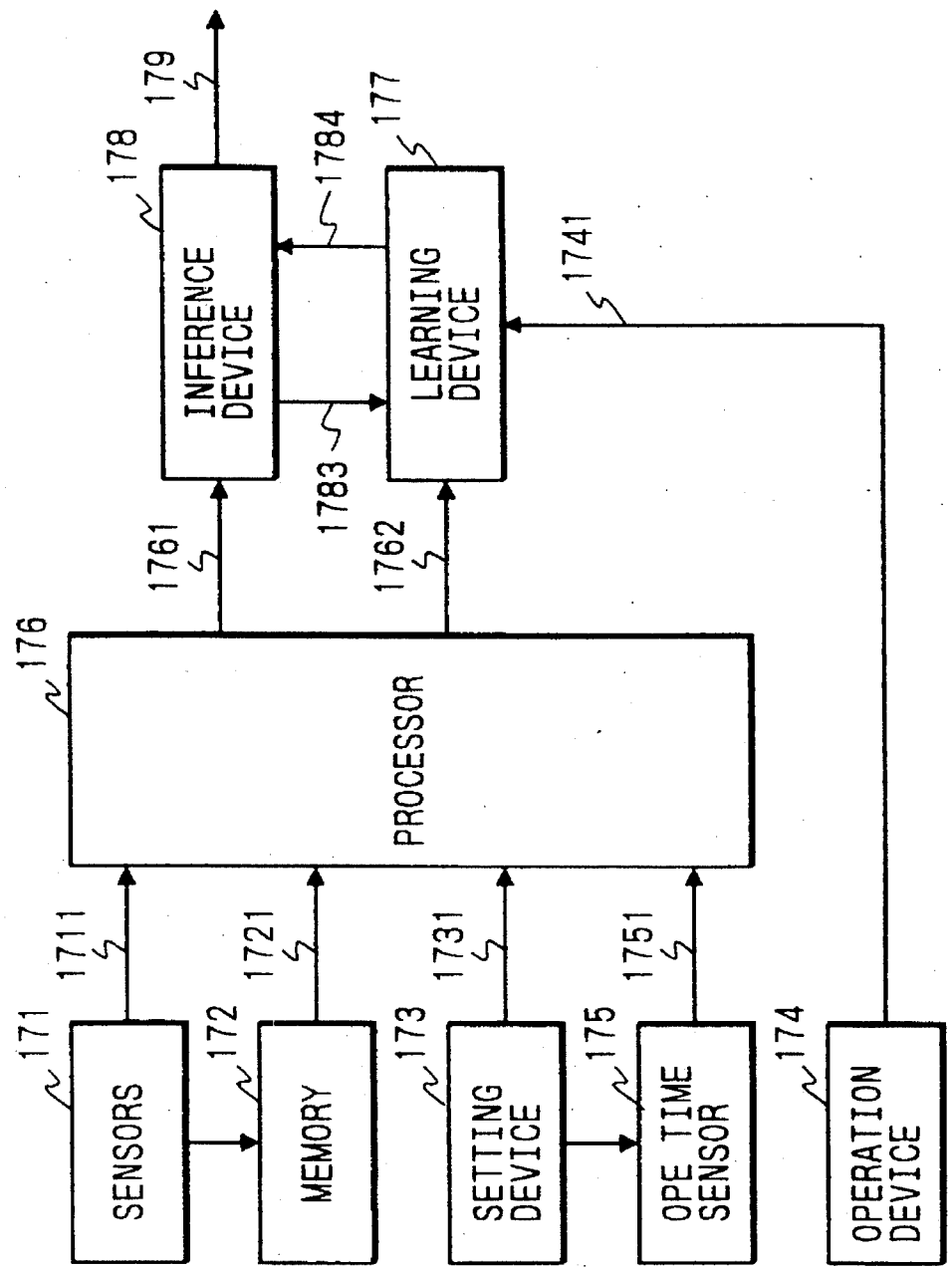
FIG. 25 is a block diagram of an environment recognition system according to a seventh embodiment of this invention.

With reference to FIG. 25, an environment recognition system includes sensors 171 for detecting conditions such as a temperature, a humidity, a radiation temperature, an output air flow rate, an output air flow direction, date, and time. A memory 172 serves to store output signals from the sensors 171. The user can set internal parameters in the system via operating a setting device 173. The user can input user's requirement or will by actuating an operation device 174. A sensor 175 detects a operation time. A processor 176 processes information fed from the devices 171, 172, 173, and 175. A learning device 177 receives an output signal of the operation device 174. An inference device (an estimator) 178 serves to infer or estimate user's will, user's feeling, and an estimation index of a controlled object.

During a preliminary process, the inference device 178 is designed in view of typical user's operation way, typical user's feeling, and an estimation index of a controlled object so that it can infer the typical user's operation way, the typical user's feeling, and the estimation index of the controlled object. During a learning process which is executed after the preliminary process, the learning device 177 corrects the inferred user's operation way, user's feeling, and estimation index of the controlled object so that they will match to the actual user and the actual place of the controlled object.

The output signals 1711, 1721, 1731, and 1751 of the devices 171, 172, 173, and 175 are inputted into the processor 176. The processor 176 normalizes the input signals, and extracts feature parameters from the input signals. The processor 176 outputs signals 1761 and 1762 to the inference device 178 and the learning device 177 respectively. The learning device 177 receives the output signal 1762 of the processor 176 and an output signal 1783 of the inference device 178, executing a learning process while using the output signal 1741 of the operation device 174 as a teacher signal. The learning process is executed each time the teacher signal 1741 is inputted. During the absence of the teacher signal 1741, when the learning device 177 receives the output signal 1762 of the processor 176, the learning device 177 outputs a signal 1784 of a learning result on the basis of the signals 1783 and 1762. The learning-result signal 1784 is fed to the inference device 178. The inference device 178 infers or estimates the user's will, the user's feeling, and the estimation index by referring to the signals 1761 and 1784. The inference device 178 outputs a signal 179 of inference results.

The learning device 177 uses one of the pattern classification systems of the first, second, third, fourth, fifth, and sixth embodiments of this invention. The learning device 177 may be of other known structures. The inference device 178 uses a neural network processor or a statistically processing device. It should be noted that the neural network processor means a signal processor having a structure similar to a neural network.

Figure 26:
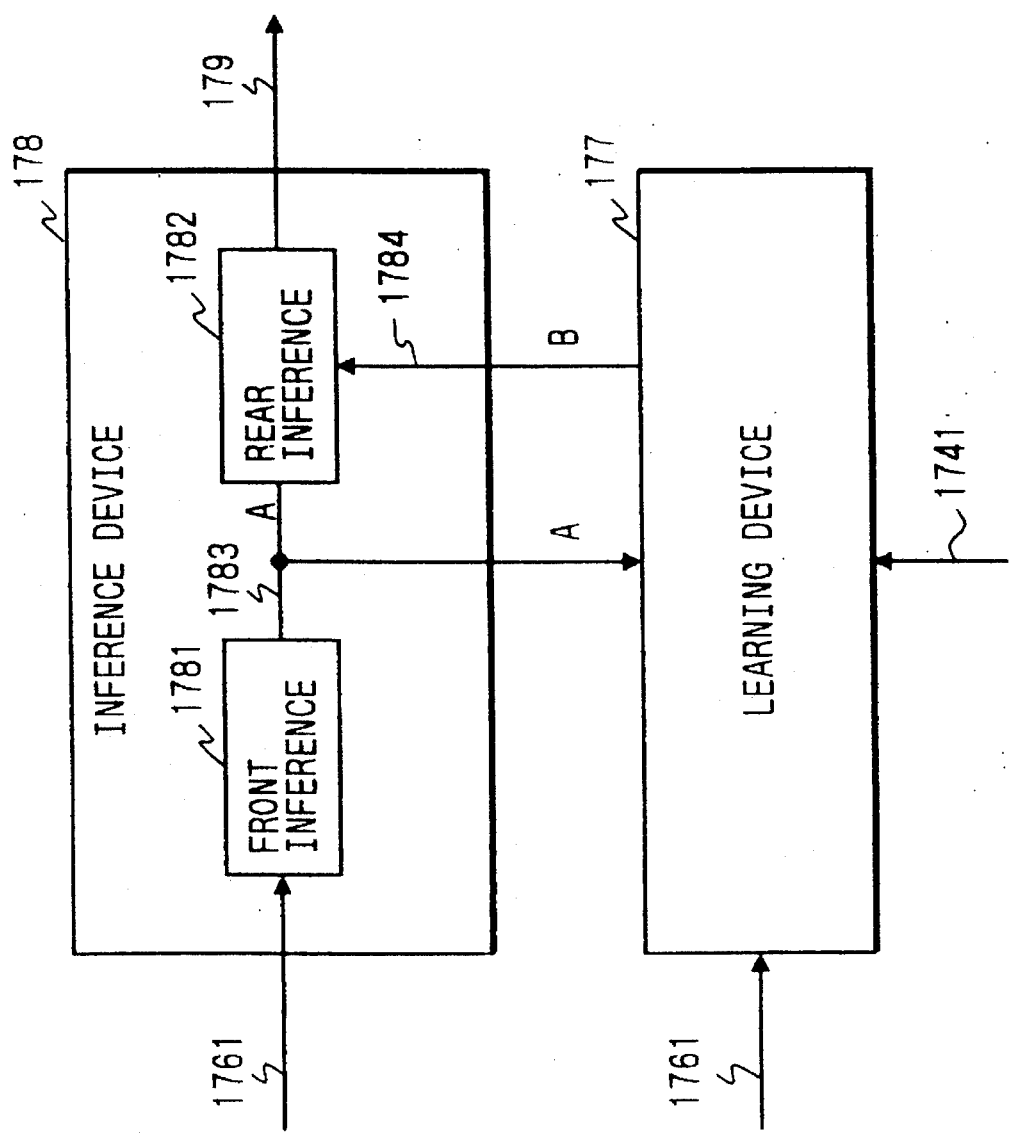
FIG. 26 is a block diagram showing a part of the environment recognition system of FIG. 25.

As shown in FIG. 26, the inference device 178 includes a front inference section 1781 and a rear inference section 1782. The front inference section 1781 infers or estimates the user's feeling and the estimation index 1783. In FIG. 26, the letter "A" denotes a value of the inferred information 1783. The inferred information 1783 is outputted from the front inference section 1781 to the rear inference section 1782 and the learning device 177. The learning device 177 generates the signal 1784 from the signal 1762 and the inferred information 1783 according to the previous learning result. The learning device 177 outputs the signal 1784 to the rear inference section 1782. In FIG. 26, the letter "B" denotes a value of the output signal 1784 of the learning device 177. The rear inference section 1782 generates and outputs the inference-result signal 179 on the basis of the inferred information 1783 and the signal 1784. For example, the inference-result signal 179 is given by a linear or nonlinear function of the values "A" and "B". According to another example, the inference-result signal 179 is given as "A+α·B" where the coefficient a is determined on the basis of the inferred information 1783 and the signal 1784.

DESCRIPTION OF THE EIGHTH PREFERRED EMBODIMENT

An eighth embodiment of this invention is directed to an air conditioner system using an environment recognition system of the seventh embodiment. The eighth embodiment will be described in detail hereinafter.

Figure 27:
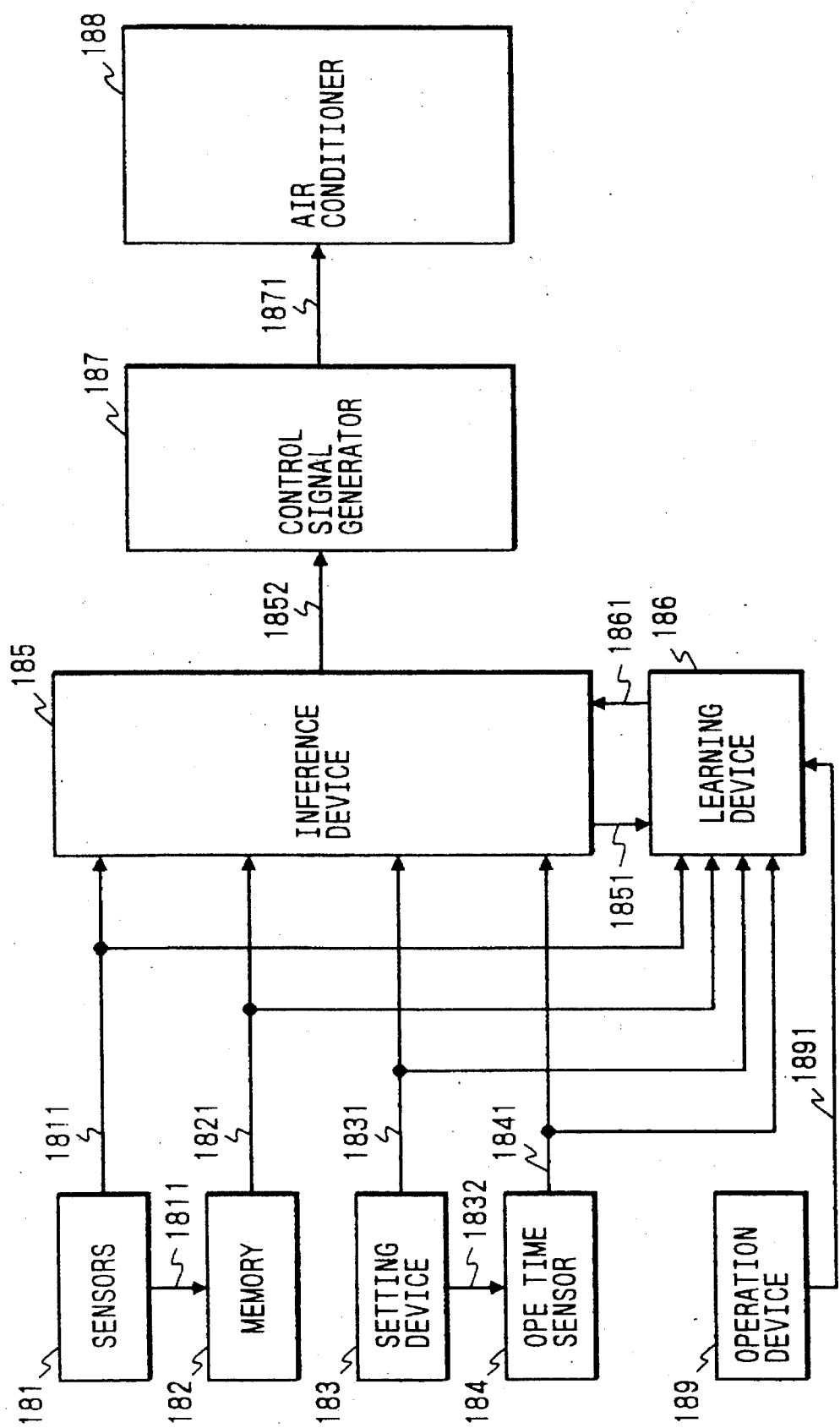
FIG. 27 is a block diagram of an air conditioner system according to an eighth embodiment of this invention.

With reference to FIG. 27, sensors 181 output signals 1811 which are stored into a memory 182. The memory 182 outputs a signal 182 1 which is equal to the stored signals. The user can set input parameters, such as a desired temperature, by operating a setting device 183. A time sensor 184 is responsive to an output signal 1832 of the setting device 183, detecting an operation time of an air conditioner 188, that is, a time elapsed from the moment of the start of operation of the air conditioner 188. The sensor 184 outputs a signal 1841 of the detected operation time. An operation inference device (an operation estimator) 185 outputs a signal 1851 representing inference values of operation contents. The operation inference device 185 outputs a signal 1852 representing inference values of operation contents which are weighted by reference information values. A learning device 186 generates the reference information values and outputs a signal 1861 representative thereof. A control signal generator 187 produces a signal 1871 designed so as to control the air conditioner 188. The control signal generator 187 outputs the control signal 1871 to the air conditioner 188. The user can input user's requirement or will by actuating an operation device 189. The operation device 189 outputs a signal 1891 of the user's will to the learning device 186 as a teacher signal.

In a factory of manufacturing air conditioners, the inference device 178 is designed in view of typical user's operation way and typical user's feeling so that it can infer the typical user's operation way and typical user's feeling. After an air conditioner 188 is shipped from the factory and is then located in a place to be air-conditioned, a learning process is executed. During the learning process, the difference between the typical user and the actual user in operation way and feeling is learned and detected, and such a difference is corrected so that control well suited to the actual user can be performed.

The inference device 185 uses a processor which operates in accordance with given rules and algorithm. The inference device 185 may use a neural network processor which is completed through a learning process. It should be noted that the neural network processor means a signal processor having a structure similar to a neural network.

The sensors 181 detect conditions such as a temperature, a humidity, a radiation temperature, an intensity of visible light, an intensity of infrared light, an output air flow rate, an output air flow direction, sound, a current time, and a calendar.

The sensors 181 include an atmospheric temperature sensor, an input air temperature sensor, and a humidity sensor which are provided in the air conditioner 188. Output signals 1811 of the sensors 181 which represent the detected conditions are fed to the inference device 185 and the memory 182. In the memory 182, the sensor output signals, for example, the input air temperature signal, are periodically sampled at intervals of N seconds. These samples of the sensor output signals are sequentially stored into a storage part of the memory 182. The memory 182 outputs a signal 1821 to the inference device 185 and the learning device 186. The output signal 1821 of the memory 182 represents slopes of the detected conditions (for example, the input air temperature) during an interval of N seconds which are equal to rates of variations in the detected conditions (for example, the input air temperature). In other words, the memory 1811 informs the inference device 185 and the learning device 186 of histories of the detected conditions.

The setting device 183 outputs a signal 1831 to the inference device 185 and the learning device 186. The signal 1831 represents a desired temperature, a desired output air flow rate, a desired output air flow direction, a degree of hotness, and a degree of coldness which are set by the user. In addition, the setting device 183 outputs a signal 1832 to the time sensor 184 which represents the moment of the start of operation of the air conditioner 188. The time sensor 184 detects the time t1 elapsed from the moment t0 of the start of operation of the air conditioner 188. The elapsed time t1 is given as follows.

$$t1 = tn - t0 \tag{1}$$

where the character "tn" denotes the current moment. The time sensor 184 outputs a signal 1841 to the inference device 185 and the learning device 186 which represents the elapsed time t1, that is, the air conditioner operation time. The time sensor 184 may have a calendar function of outputting calendar information representing a month, a day, and a time. In this case, the output signal 1841 of the time sensor 184 includes the calendar information.

The inference device 185 receives the output signals 1811, 1821, 1831, and 1841 of the devices 181, 182, 183, and 184. The inference device 185 includes a neural network processor which is previously completed through a learning process. The neural network processor 185 infers or estimates values of the contents of operation of the setting device 183 which is executed by the user. The neural network processor 185 outputs a signal 1851 to the learning device 186 which represents the inferred values of operation contents. The inferred values of operation contents represent, for example, a requirement of increasing the temperature by one degree centigrade, or a requirement of increasing the output air flow rate by one level. The inference device 185 processes the inferred values of operation contents into corrected values of operation contents through a weighting process in which the inferred values of operation contents are weighted by reference information values. For this purpose, the inference device 185 receives an output signal 1861 of the learning device 186 which represents the reference information values. The inference device 185 outputs the signal 1871 to the control signal generator 187 which represents the corrected values of operation contents. The control signal generator 187 produces the control signal 1871 in response to the corrected values of operation contents. The control signal generator 187 outputs the control signal 1871 to the air conditioner 188, controlling the air conditioner 188 in accordance with the control signal 1871.

The learning device 186 receives the output signals 1811, 1821, 1831, and 1841 of the devices 181, 182, 183, and 184. The user can input user's requirement or will by actuating the operation device 189. The operation device 189 quantifies the user's will and generates a signal 1891 representing a result of the quantification of the user's will. The output signal 1891 of the operation device 189 is fed to the leaning device 186 as a teacher signal 1891. The leaning device 186 includes a neural network processor. The neural network processor leas whether or not the inferred values 1851 of operation contents, which are outputted from the inference device 185, are correct by referring to the teacher signal 1891. The neural network processor executes such a learning process each time the teacher signal 1891 is inputted. The neural network processor generates reference information values 1861 which result from the learning process. Each time the learning process is executed, the learning device 186 outputs the reference information values 1861 to the inference device 185.

As described previously, the inference device 185 updates the inferred values of operation contents into the corrected values (learned values) 1852 of operation contents in response to the reference information values 1861. Such updating processes are executed sequentially as learning processes are executed. It should be noted that the updating processes may be executed after the execution of the learning processes.

The inference device 185 includes a neural network processor using an LVQ (Leaning Vector Quantum) model for pattern classification. The LVQ model is shown in "Self-Organization and Associative Memory", 2nd, Springer-Verlag, 1988, written by T. Kohonen, the disclosure of which is hereby incorporated by reference.

Figure 28:
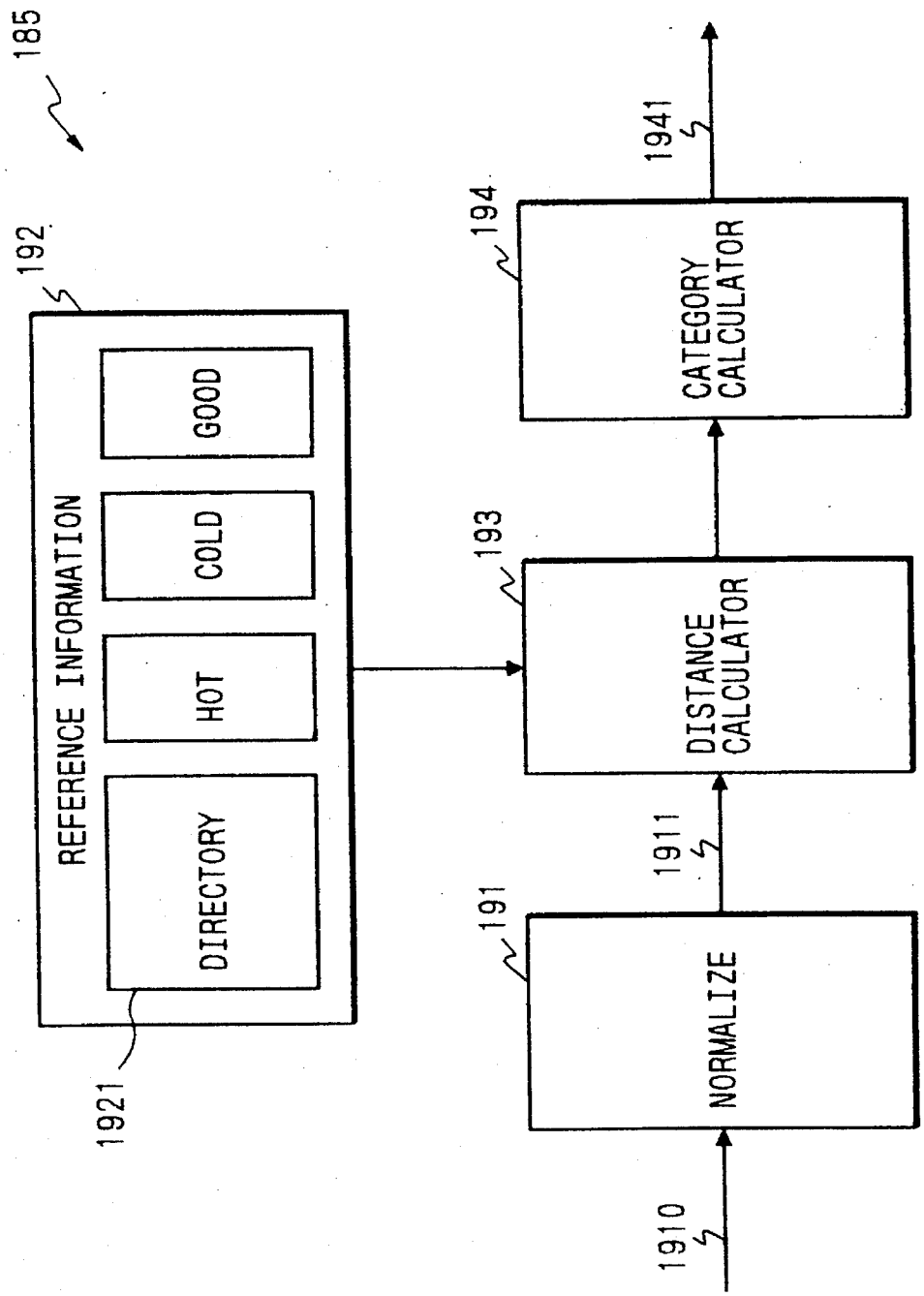
FIG. 28 is a block diagram of the inference device of FIG. 27.
Figure 29:
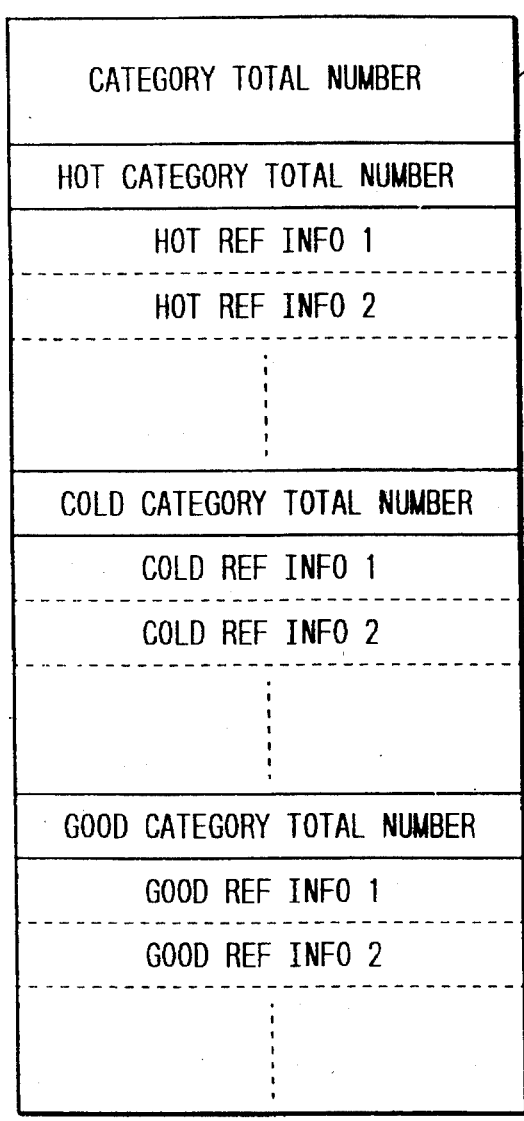
FIG. 29 is a diagram showing an example of the contents of the directory of FIG. 28.
Figure 30:
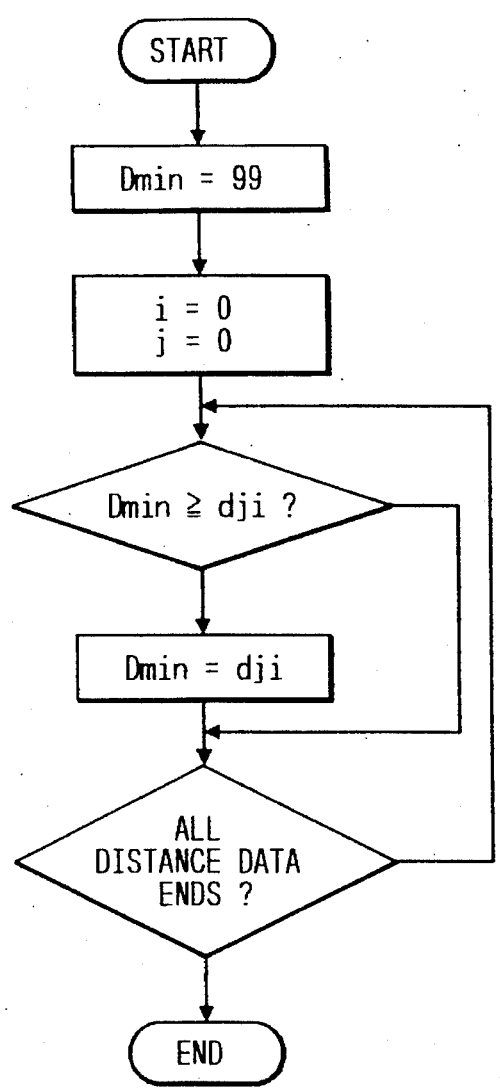
FIG. 30 is a flowchart of a program operating the category calculator of FIG. 28.

As shown in FIG. 28, the inference device 185 includes a normalizing section 191, a reference information section 192, a distance calculator 193, and a category calculator 194. The normalizing section 191 receives signals 19 10 equal to the output signals 1811, 1821, 1831, and 1841 of the devices 181, 182, 183, and 184 (see FIG. 27). The normalizing section 191 normalizes the received signals 1910. Each of the received signals 1910 is now represented by the character "x1". The normalizing section 191 generates normalized signals Sx1 each expressed as follows.

$$Sx1=(xmax-x1)/(xmax-xmin) \quad (2)$$

where the characters "ymax" and "xmin" denote maximum and minimum values of the related received signal respectively. The received signals 1910 represent the conditions such as the atmospheric temperature, the input air temperature, the slope of a variation in the input air temperature, the output air flow rate, the desired temperature, the degree of hotness, and the degree of coldness. The normalizing section 191 outputs the normalized signals Sx1 to the distance calculator 193 as an input vector 1911. The reference information section 192 informs the distance calculator 193 of reference information vectors. The reference information vectors are contained in either of categories such as "hot", "cold", and "good". The distance calculator 193 calculates the distances between the input vector and the reference information vectors. For example, the distance dAj between the input vector and the reference information vectors in the category "hot" is given as follows.

$$dAj=\Sigma(xi-Raij)^2 \quad (3)$$

where the character "dAj" denotes the distance between the input vector and the j-th reference information vector in the category "hot", and the character "xi" denotes the i-th input vector value and the character "Raji" denotes the i-th vector value of the j-th reference information vector in the category "hot". Similarly, the distances between the input vector and the other information vectors in the category "hot" are calculated, and further the distances between the input vector and the information vectors in the other categories are calculated. A directory 1921 is provided in the reference information section 192. FIG. 29 shows an example of the contents of the directory 1921. The distance calculator 193 detects the total number of the categories, and the numbers of references in the respective categories by referring to the contents of the directory 1921. The total number dnum of the calculated distances is given as follows.

$$dnum=m1+m2+m3 \quad (4)$$

where the character "m1" denotes the number of references in the category "hot", and the character "m2" denotes the number of references in the category "cold" and the character "m3" denotes the number of references in the category "good". The distance calculator 193 informs the category calculator 194 of the calculated distances. The category calculator 194 determines or selects the minimum distance "dim" from among the calculated distances. In addition, the category calculator 194 determines or selects the category corresponding to the minimum distance. In this way, the category calculator 194 detects or selects the category which contains the reference information vector closest to the input vector. For example, the category calculator 194 uses a processor having a ROM. The processor operates in accordance with a program stored in the ROM. FIG. 30 is a flowchart of an example of a segment of the program for selecting the minimum distance from among the calculated distances. The category calculator 194 outputs a signal 1941 representing the detected or selected category. The output signal 1941 of the category calculator 194 is used as the output signal 1852 of the inference device 185 (see FIG. 27).

As described previously, the control signal generator 187 receives the output signal 1852 of the inference device 185. The control signal generator 187 produces the control signal 1871 in accordance with the category represented by the output signal 1852 of the inference device 185. For example, when the category "hot" is represented by the signal 1852, the control signal generator 187 produces a control signal 1871 of decreasing the desired temperature by a given level. In addition, when the category "cold" is represented by the signal 1852, the control signal generator 187 produces a control signal 1871 of increasing the desired temperature by a given level. Furthermore, when the category "good" is represented by the signal 1852, the control signal generator 187 produces a control signal 1871 of holding the desired temperature unchanged.

Figure 31:
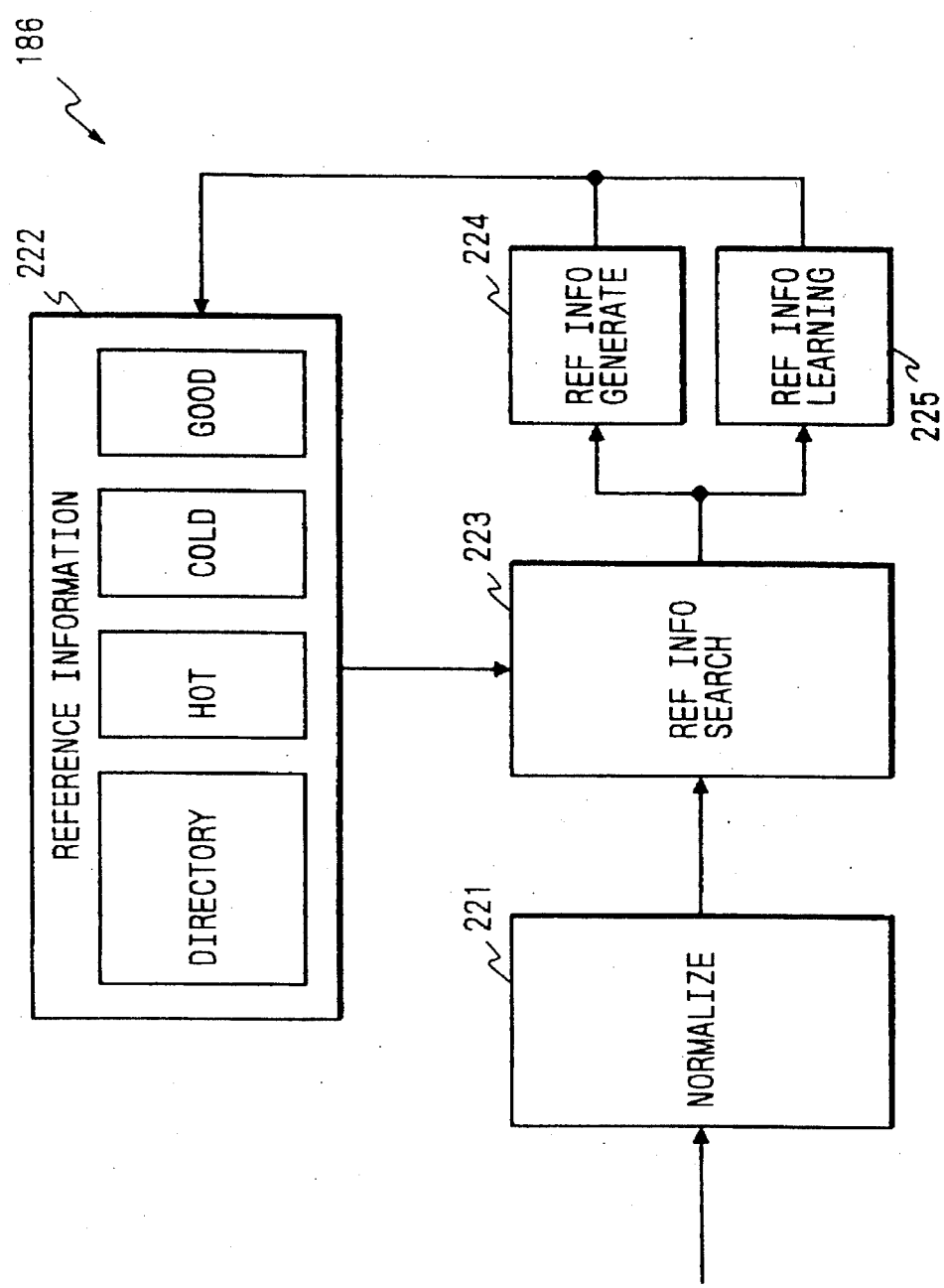
FIG. 31 is a block diagram of the learning device of FIG. 27.

As shown in FIG. 31, the learning device 186 includes a normalizing section 221, a reference information section 222, a reference information search section 223, a reference information generating section 224, and a reference information learning section 225. The normalizing section 221 receives the output signals 1811, 1821 , 1831, and 1841 of the devices 181, 182, 183, and 184 (see FIG. 27). The normalizing section 221 normalizes the received signals and combines the normalized signals into an input vector as the normalizing section 191 of FIG. 28 does. The reference information section 222 is the same as the reference information section 192 of FIG. 28. In other words, the reference information section 222 and the reference information section 192 of FIG. 28 are common. The normalizing section 221 feeds the input vector to the search section 223. In addition, the search section 223 receives a teacher signal representing a good (correct) category TC which contains the input vector. The teacher signal is equal to the output signal 1891 of the operation section 189 (see FIG. 27). The search section 223 refers to the contents of a directory in the reference information section 222, and executes the following process according to the directory contents. It is now assumed that the correct category TC of the input vector is equal to a category "hot". In this case, the search section 223 activates the generating section 224 but deactivates the learning section 225 when the number of references in the category "hot" is smaller than the maximum number of references in the category "hot". Furthermore, the search section 223 deactivates the generating section 224 but activates the learning section 225 when the number of references in the category "hot" is equal to or greater than the maximum number of references in the category "hot". The generating section 224 newly produces a reference in the correct category TC of the input vector by referring to the input vector. For example, the generating section 224 produces a reference in the category "hot" by referring to the input vector, and thereby increases the number of references in the category "hot" by one.

The learning section 225 compares the correct category TC of the input vector and a category corresponding to the output signal 1831 of the setting device 183. When the two categories are equal, the learning section 225 moves a reference, which is closest to the input vector, toward the input vector by referring to the following computer-language statement.

$$RV = RV + \alpha(RV - Sx)$$

where the character "RV" denotes the reference closest to the input vector, and the character "Sx" denotes the input vector and the character "α" denotes a learning rate which determines the magnitude of the movement of the reference. When the two categories are different, the learning section 225 moves a reference, which is closest to the input vector, away from the input vector by referring to the following computer-language statement.

$$RV = RV - \alpha(RV - Sx)$$

As understood from the previous description, the generating section 224 periodically produces a reference in the correct category of the input vector by referring to the input vector until the number of the references reaches the maximum number thereof. After the number of the references reaches the maximum number thereof, the learning section 225 operates as follows. When the two compared categories are equal, the learning section 225 moves a reference, which is closest to the input vector, toward the input vector. When the two compared categories are different, the learning section 225 moves a reference, which is closest to the input vector, away from the input vector.

DESCRIPTION OF THE NINTH PREFERRED EMBODIMENT

A ninth embodiment of this invention is similar to the embodiment of FIGS. 27–31 except for design changes described hereinafter. According to the ninth embodiment, a predictive mean vote (PMV) is used as a comfortableness estimation index in air conditioning.

The PMV is decided as follows. An environment test room containing examined persons is subjected to condition changes. Specifically, a temperature, a humidity, an air flow speed, a radiation temperature, a metabolic rate, and person's clothing conditions are changed. The examined persons cast votes regarding a feeling of warmness and coolness. PMV values are calculated on the basis of the result of the votes. The calculated PMV values are −3, −2, −1, 0, +1, +2, and +3 which correspond to "cold", "cool", "slightly cool", "good", "slightly warm", "warm", and "hot" respectively.

Specifically, the PMV values are determined by referring to the following equations.

$$PMV = (0.303 e^{-0.036M} + 0.028) \times [(M - W) - 3.05 \cdot 10^{-3}\{5733 - 6.99(M - W) - pa\} - 0.42\{(M - W) - 58.15\} - 1.7 \cdot 10^{-5} M(5867 - pa) - 0.0014 M(34 - ta) - 3.96 \cdot 10^{-8} fcl\{(tcl + 273)^4 - (tr + 273)^4\} - fcl hc(tcl - ta)]$$

$$tcl = 35.7 - 0.028(M - W) - 0.155 Icl[3.96 \cdot 10^{-8} fcl\{(tcl + 273)^4 - (tr + 273)^4\} + fcl hc(tcl - ta)]$$

$$hcl = 283(tcl - ta)^{0.25}$$
$$\text{for } 2.83(tcl - ta)^{0.25} > 12.1 \sqrt{var}$$

$$= 12.1 \sqrt{var}$$
$$\text{for } 2.83(tcl - ta)^{0.25} < 12.1 \sqrt{var}$$

$$fcl = 1.00 + 0.2 Icl \quad \text{for } Icl < 0.5 clo$$
$$= 1.05 + 0.1 Icl \quad \text{for } Icl > 0.5 clo$$

e: base of natural logarithm
M: metabolic rate [W/m²]
W: external work [W/m²]
pa: water vapor pressure [Pa]
ta: air temperature [°C]
fc: clothing area factor
tc: clothing surface temperature [°C]
tr: average radiation temperature [°C]
hc: convection thermal conductivity [W/m²°C]
Icl: clothing thermal resistance [clo]
var: relative air velocity [m/s}

The values of output signals of sensors are placed into the above-mentioned equations, and thereby the PMV values (the degree of comfortableness) are calculated.

In general, the air temperature, the radiation temperature, the humidity, and the air velocity are directly detected by the sensors. The radiation temperature, the humidity, and the air velocity may be detected on the basis of sensors and air conditioner control information. For example, the radiation temperature is previously learned from the atmospheric temperature, the inside air temperature, the desired temperature, and the air flow rate by using a neural network processor, and the neural network processor which is completed in the learning process is used as an inference device.

A clothing amount and the metabolic rate are varied in response to user's requirement or will. Specifically, the clothing amount and the metabolic rate are previously learned in accordance with user's requirement or will. This learning process is similar to the learning process in the embodiment of FIGS. 7–12. During the learning process, when the user's will indicates "hot", the clothing mount A [clo] is reduced as "(A−α) [clo]". When the user's will indicates "cold", the clothing amount A [clo] is increased as "(A+α) [clo]". A hardware for executing the learning process uses the pattern classification system of the embodiment of FIGS. 7–12. During the learning process, the inside and outside environment information, the operation time, the user's setting conditions, and the clothing amount are inputted into the learning hardware. In addition, a teacher signal is generated on the basis of user's statement, and the teacher signal is inputted into the learning hardware. Information of the changed clothing amount is stored in the air conditioner system. As long as the user's statement continues, the information of the changed clothing amount is used as an indication of the current clothing amount. In the case where the user's will is of two or more types, the value α is changed with the number of types of the user's will. Similarly, the metabolic rate is learned. The PMV values are calculated on the basis of the changed clothing amount and the changed metabolic rate by using the inference device including the neural network processor. The calculated PMV values are transmitted to an air conditioner control section. The air conditioner control section executes the control of the air temperature and the air flow rate in response to the PMV values. The inference device may be of other structures.

What is claimed is:

1. An environment recognition system comprising:
   a plurality of sensors for detecting environment conditions;

memory means for storing previously-occurring output signals of the sensors;

setting means for setting parameters in response to user's operation;

an operation time detector for detecting an operation time;

inference means for inferring information related to an estimation index of at least one of user's will and the system on the basis of output signals of the sensors, the memory means, the setting means, and the operation time detector;

an operation device for inputting information related to an estimation index of at least one of user's will and the system in response to user's operation; and learning means for learning a relation of the information related to the estimation index of at least one of the user's will and the system while using an output signal of the operation device as a teacher signal.

2. The environment recognition system of claim 1, wherein the inference means has a neural network structure.

3. The environment recognition system of claim 1, wherein the information learned by the learning means includes user's will, user's activity, user's metabolic rate, and user's clothing amount.

4. The environment recognition system of one of claim 1, wherein the information inferred by the inferring means includes user's will, user's activity, user's metabolic rate, and user's clothing amount.

5. The environment recognition system of claim 1, wherein the information of user's will which is inputted via the operation device is classified into one of at least two different types.

6. The environment recognition system of claim 1, wherein the information of user's will which is inputted via the operation device is classified into one of at least two different types corresponding to a hotness feeling and a coldness feeling respectively.

7. The environment recognition system of claim 1, wherein the information of user's will which is inputted via the operation device is represented by a numerical value.

8. The environment recognition system of claim 1, further comprising means for outputting a degree of comfortableness in response to the inferred information.

9. The environment recognition system of claim 8, wherein the operation time is equal to a time elapsed from a moment of start of operation.

10. The air conditioner system of claim 1, wherein the sensors detect an air flow rate in the air conditioner, a capacity of the air conditioner, and an air flow direction related to the air conditioner.

11. An environment recognition system comprising:

a plurality of sensors for detecting environment conditions;

memory means for storing previously-occurring output signals of the sensors;

setting means for setting parameters in response to user's operation;

an operation time detector for detecting an operation time;

a calculator for calculating a feature signal representing a feature of at least one of output signals of the sensors, the memory means, the setting means, and the operation time detector;

inference means for inferring information related to an estimation index of at least one of user's will and the system on the basis of output signals of the sensors, the memory means, the setting means, the operation time detector, and the calculator;

an operation device for inputting information related to an estimation index of at least one of user's will and the system in response to user's operation; and learning means for learning a relation of the information related to, the estimation index of at least one of the user's will and the system while using an output signal of the operation device as a teacher signal.

12. An environment recognition system comprising:

a plurality of sensors for detecting environment conditions;

memory means for storing previously-occurring output signals of the sensors;

setting means for setting parameters in response to user's operation;

an operation time detector for detecting an operation time;

inference means for inferring information related to an estimation index of at least one of user's will and the system on the basis of output signals of the sensors, the memory means, the setting means, and the operation time detector;

an operation device for inputting information related to an estimation index of at least one of user's will and the system in response to user's operation; and learning means for learning a relation of the information related to the estimation index of at least one of the user's will and the system while using an output signal of the operation device as a teacher signal;

wherein the inference means and the learning means comprises a pattern classification system including:

a plurality of classification sections each including means for storing information of N coefficients W representing a reference pattern, means for calculating an evaluation value V on the basis of N input signals S and the N coefficients W, the N input signals representing an input pattern, the evaluation value V representing a relation between the input pattern and the reference pattern, means for storing information of a fixed threshold value R, means for comparing the evaluation value V and the threshold value R and for outputting an estimation signal depending on a result of the comparing, the estimation signal including a category signal P which represents a category;

a selection section for selecting one of categories in response to the category signals outputted from the classification sections and for outputting a signal Px representing the selected one of the categories; and an adjustment section for adjusting parameters in the classification sections in response to the output signal Px of the selection section and a teacher signal T, the parameters including the coefficients W.

13. The environment recognition system of claim 11, wherein the sensors detect a temperature, a humidity, a radiation temperature, an air flow rate, an air flow direction, an intensity of visible light, an intensity of infrared light, sound, a time, and a calendar.

14. An air conditioner system comprising:

an air conditioner; and an environment recognition system for controlling the air conditioner;

wherein the environment recognition system comprises:

a plurality of sensors for detecting environment conditions;

memory means for storing previously-occurring output signals of the sensors;

setting means for setting parameters in response to user's operation;

an operation time detector for detecting an operation time;

inference means for inferring information related to an estimation index of at least one of user's will and the system on the basis of output signals of the sensors, the memory means, the setting means, and the operation time detector;

an operation device for inputting information related to an estimation index of at least one of user's will and the system in response to user's operation; and learning means for learning a relation of the information related to the estimation index of at least one of the user's will and the system while using an output signal of the operation device as a teacher signal.

* * * * *